(12) United States Patent
Ogura

(10) Patent No.: US 9,313,254 B2
(45) Date of Patent: Apr. 12, 2016

(54) SERVICE REQUEST APPARATUS, SERVICE REQUEST METHOD, AND RECORDING MEDIUM

(71) Applicant: FUJITSU LIMITED, Kawasaki-shi (JP)

(72) Inventor: Takao Ogura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 13/720,544

(22) Filed: Dec. 19, 2012

(65) Prior Publication Data

US 2013/0246528 A1 Sep. 19, 2013

(30) Foreign Application Priority Data

Mar. 15, 2012 (JP) ................................ 2012-059243

(51) Int. Cl.
| | |
|---|---|
| H04L 29/08 | (2006.01) |
| G06F 21/60 | (2013.01) |
| G06F 21/33 | (2013.01) |
| G06F 21/31 | (2013.01) |

(Continued)

(52) U.S. Cl.
CPC ................ *H04L 67/02* (2013.01); *G06F 21/31* (2013.01); *G06F 21/33* (2013.01); *G06F 21/608* (2013.01); *H04L 63/10* (2013.01); *H04L 67/142* (2013.01); *H04L 67/146* (2013.01); *H04L 67/2814* (2013.01); *H04L 63/08* (2013.01); *H04N 1/00222* (2013.01)

(58) Field of Classification Search
None
See application file for complete search history.

(56) References Cited

U.S. PATENT DOCUMENTS

| 6,085,247 A | 7/2000 | Parsons, Jr. et al. |
| 7,802,295 B2 * | 9/2010 | Murase .................... G06F 21/33 713/156 |
| 8,078,689 B2 * | 12/2011 | Pedersen ................. H04L 63/08 709/217 |

(Continued)

FOREIGN PATENT DOCUMENTS

| JP | 10-155140 A | 6/1998 |
| JP | 2002-335268 | 11/2002 |

(Continued)

OTHER PUBLICATIONS

Richard III, Golden G. "Service advertisement and discovery: Enabling universal device cooperation." Internet Computing, IEEE 4.5 (2000): pp. 18-26.*

(Continued)

*Primary Examiner* — Ranodhi Serrao
*Assistant Examiner* — James Fiorillo
(74) *Attorney, Agent, or Firm* — Fujitsu Patent Center

(57) ABSTRACT

A service request apparatus includes a storage unit and a processor coupled to the storage unit, wherein the processor executes a process including: storing in the storage unit source session information and destination session information in association with a user identifier, the source session information indicating information on a session used by a service source that is requested by the user for provision of a service, and the destination session information indicating information on a session used by a service destination; determining whether the user identifier of the user who requests the service source for provision of the service is stored in the storage unit; and requesting, when the user identifier is stored, the service source for provision of the service in cooperation with the service destination connected using the destination session information associated with the source session information, the service source being connected using the source session information.

6 Claims, 19 Drawing Sheets

(51) Int. Cl.
*H04L 29/06* (2006.01)
*H04N 1/00* (2006.01)

(56) References Cited

U.S. PATENT DOCUMENTS

| | | | |
|---|---|---|---|
| 8,332,919 B2* | 12/2012 | Gomi | H04L 63/08 713/168 |
| 8,526,037 B2* | 9/2013 | Emori | G06F 21/608 358/1.14 |
| 2002/0120743 A1 | 8/2002 | Shabtay et al. | |
| 2006/0242232 A1* | 10/2006 | Murillo | H04L 12/1813 709/204 |
| 2007/0044146 A1* | 2/2007 | Murase | G06F 21/33 726/10 |
| 2009/0055904 A1* | 2/2009 | Gomi | H04L 63/08 726/4 |
| 2009/0059287 A1* | 3/2009 | Yamada | H04N 1/00222 358/1.15 |
| 2009/0070417 A1* | 3/2009 | Bao | H04W 4/10 709/203 |
| 2010/0079785 A1* | 4/2010 | Emori | G06F 21/608 358/1.14 |
| 2010/0134818 A1* | 6/2010 | Minamizono | G06F 3/1288 358/1.13 |
| 2012/0016951 A1* | 1/2012 | Li | H04N 21/6125 709/217 |
| 2013/0191929 A1* | 7/2013 | Yin | G06R 21/31 726/28 |
| 2013/0329735 A1 | 12/2013 | Yamazaki et al. | |
| 2014/0123240 A1* | 5/2014 | Seo | H04L 63/104 726/4 |

FOREIGN PATENT DOCUMENTS

| | | |
|---|---|---|
| JP | 2006-229265 A | 8/2006 |
| JP | 2010-86435 A | 4/2010 |
| JP | 2010-103709 A | 5/2010 |
| JP | 2011-81815 | 4/2011 |

OTHER PUBLICATIONS

E. Hammer-Lahav, et al. The OAuth 2.0 Authorization Protocol draft-ietf-oauth-v2-22. Sep. 2011, pp. 1-64 [online], [retrieved on Jan. 31, 2012]. Retrieved from the Internet <URL: http://tools.ietf.org/html/draft-ietf-oauth-v2-22>.

D. Hardt, Ed. RFC 6749—The OAuth 2.0 Authorization Framework. Oct. 2012, pp. 1-76 [online], [retrieved on Dec. 6, 2012]. Retrieved from the Internet <URL: http://tools.ietf.org/html/rfc6749>.

Japanese Office Action mailed Sep. 1, 2015 for corresponding Japanese Patent Application No. 2012-059243, with Partial English Translation, 15 pages.

* cited by examiner

FIG.4

| IDP_URL | SERVICE OPERATOR |
|---|---|
| https://IDP0.com | COMPANY F |
| https://IDP1.com | COMPANY A |
| https://IDP2.com | COMPANY B |
| ... | ... |

FIG.5

AUTHENTICATION INFORMATION TABLE GROUP

COMPANY A

| TENANT ID | USER ID | COMPANY A'S ID | COMPANY A'S PASSWORD |
|---|---|---|---|
| tenantX | user001 | a_ID | a_PW |
| tenantY | user002 | aa_ID | aa_PW |
| ... | ... | ... | ... |

COMPANY B

| TENANT ID | USER ID | COMPANY B'S ID | COMPANY B'S PASSWORD |
|---|---|---|---|
| tenantX | user001 | b_ID | b_PW |
| tenantY | user002 | bb_ID | bb_PW |
| ... | ... | ... | ... |

FIG.6

| TENANT ID | SERVICE URL | IDP_URL | COOPERATION DESTINATION'S IDP_URL |
|---|---|---|---|
| tenantX | https://service1.com | https://IDP1.com | https://IDP2.com |
| tenantX | https://service2.com | https://IDP2.com | https://IDP3.com |
| ... | ... | ... | ... |

FIG.7

| TENANT ID | USER ID | SERVICE URL | IDP_URL | ID | PW |
|---|---|---|---|---|---|
| tenantX | user001 | https://service1.com | https://IDP1.com | a_ID | a_PW |
| tenantX | user001 | https://service2.com | https://IDP2.com | b_ID | b_PW |
| ... | ... | ... | ... | ... | ... |

FIG.8

| USER SESSION ID | TENANT ID | USER ID | SERVICE URL (COOPERATION SOURCE) | COOPERATION SOURCE'S SESSION ID | SERVICE URL (COOPERATION DESTINATION) | COOPERATION DESTINATION'S SESSION ID |
|---|---|---|---|---|---|---|
| aaa | tenantX | user001 | https://service1.com | yyyyy | https://service2.com | zzzzz |
| ... | ... | ... | ... | ... | ... | ... |

FIG.9

| SERVICE URL | ID | SESSION ID | STATE | COOPERATION DESTINATION |
|---|---|---|---|---|
| https://service1.com | a_ID | yyyyy | login | https://service2.com |
| https://service2.com | b_ID | zzzzz | login | https://service1.com |
| ... | ... | ... | ... | ... |

FIG.20

| SERVICE URL (COOPERATION SOURCE) | SERVICE URL (COOPERATION DESTINATION) | SESSION OPERATION | TIMEOUT |
|---|---|---|---|
| ... | ... | ... | ... |
| https://service1.com | https://service2.com | MAINTAIN | 24 HOURS |
| https://service5.com | https://service6.com | DELETE | - |
| ... | ... | ... | ... |

SERVICE REQUEST APPARATUS, SERVICE REQUEST METHOD, AND RECORDING MEDIUM

CROSS-REFERENCE TO RELATED APPLICATION

This application is based upon and claims the benefit of priority of the prior Japanese Patent Application No. 2012-059243, filed on Mar. 15, 2012, the entire contents of which are incorporated herein by reference.

FIELD

The embodiments discussed herein are directed to a service request apparatus, a service request method, and a recording medium.

BACKGROUND

Conventionally, there is known a Web service called a mashup, etc., that provides a new service by allowing a plurality of services to cooperate with one another. For example, as one mode of service cooperation, there is a printing service where a plurality of services with different providing sources are allowed to cooperate with one another. Specifically, a user stores data in a document management service provided by company B. Company A obtains the data of the user kept in company B and prints the data on a printing machine at company C, using a printing service provided thereby.

An authentication method using OAuth 2.0 is used for such service cooperation. In the authentication method using OAuth 2.0, a pre-authentication phase and a verification phase are performed. For example, in the pre-authentication phase, the user accesses company A using a Web browser, etc., to perform user authentication. If the authentication result is OK, then the user requests company A for a printing service. When company A receives the request for a printing service, company A requests company B for provision of data by redirection via a user terminal.

In the verification phase, the user performs authentication with company B using a Web browser, etc. Then, company B transmits a result of the authentication performed by the user to company A through the user terminal. Thereafter, company A transmits an access token request to company B, using an API (Application Program Interface) for performing a printing service. Company B transmits, as a response, an access token indicating an API for obtaining user data. Then, company A transmits the access token received from company B, to company B to request to obtain user data. In this manner, company B provides company A with the user data.

By thus exchanging an access token which is a permit allowed by the user, between company A and company B in the verification phase, access right authority delegation is performed, thereby implementing secure service cooperation. In addition, in OAuth 2.0, if the user is being logged in to the service, then service cooperation is performed with a verification phase being omitted during an access token validity period.

Non-Patent Document 1: OAuth 2.0 IETF rfc6749 "http://tools.ietf.org/html/rfc6749"

However, in the conventional art, when a large number of service requests are made, a large number of verification phases in OAuth processes may be performed. Therefore, the OAuth processes become a bottleneck, causing a problem of degradation in processing performance.

For example, in OAuth 2.0, both of a pre-authentication phase and a verification phase are performed for new users and users who log in again after logout. Hence, when a large number of such users transmit service requests to the above-described company A, company A results in performing a large number of OAuth processes, increasing processing load. In this case, company A encounters delays in OAuth processes themselves and delays in other processes such as data transmission to company B, and thus, the performance as the whole service degrades.

SUMMARY

According to an aspect of the embodiments, a service request apparatus includes: a storage unit; and a processor coupled to the storage unit, wherein the processor executes a process including: storing in the storage unit cooperation source session information and cooperation destination session information in association with a user identifier that identifies a user, the cooperation source session information indicating information on a session used by a service cooperation source that is requested by the user for provision of a service, and the cooperation destination session information indicating information on a session used by a service cooperation destination that provides the user with the service in cooperation with the service cooperation source; determining whether the user identifier of the user who requests the service cooperation source for provision of the service is stored in the storage unit; and requesting, when it is determined at the determining that the user identifier is stored, the service cooperation source for provision of the service in cooperation with the service cooperation destination connected using the cooperation destination session information associated with the cooperation source session information, the service cooperation source being connected using the cooperation source session information stored in the storage unit in association with the user identifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of information stored in a cloud association table of a management server;

FIG. 5 is a diagram illustrating an example of information stored in an authentication information table of the management server;

FIG. 6 is a diagram illustrating an example of information stored in a cooperation service table of a GW apparatus;

FIG. 7 is a diagram illustrating an example of information stored in an account management table of the GW apparatus;

FIG. 8 is a diagram illustrating an example of information stored in a session management table of the GW apparatus;

FIG. 9 is a diagram illustrating an example of information stored in a session maintenance table of the GW apparatus;

FIG. 20 is a diagram illustrating an exemplary determination criterion for session information;

DESCRIPTION OF EMBODIMENTS

Preferred embodiments will be explained with reference to accompanying drawings. Note that the present invention is not limited by the embodiments.

[a] First Embodiment

Figure 1:
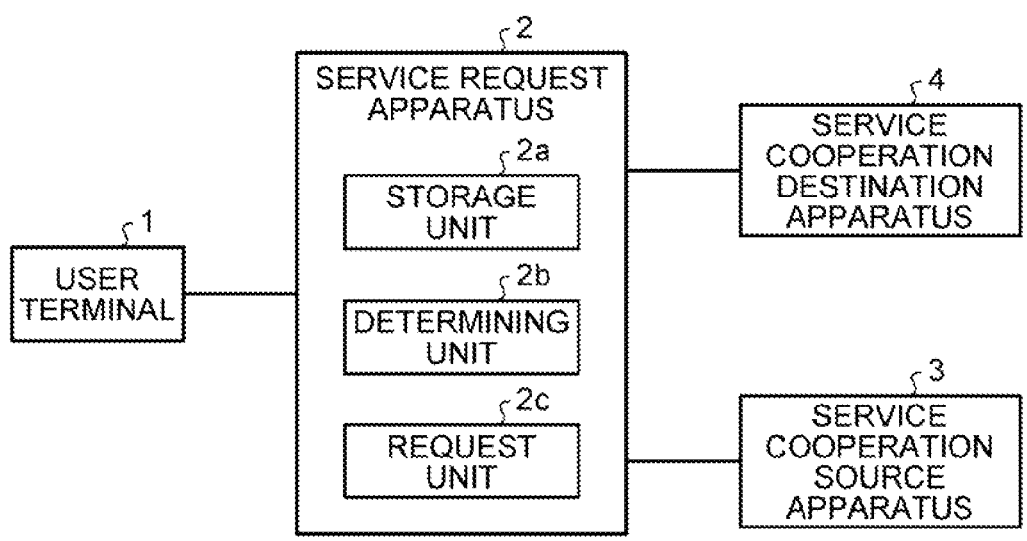
FIG. 1 is a diagram illustrating an exemplary overall configuration of a service providing system according to a first embodiment.

FIG. 1 is a diagram illustrating an exemplary overall configuration of a service providing system according to a first embodiment. As illustrated in FIG. 1, the service providing system includes a user terminal 1, a service request apparatus 2, a service cooperation source apparatus 3, and a service cooperation destination apparatus 4. The apparatuses are connected to each other through a network. For the network, various networks such as the Internet, a LAN (Local Area Network), a WAN (Wide Area Network), and a VPN (Virtual Private Network) can be adopted.

The service providing system is a system that complies with OAuth 2.0 and that provides the user terminal 1 with a service by the service cooperation source apparatus 3 cooperating with the service cooperation destination apparatus 4. For example, a printing service, etc., can be applied to the service providing system. As an example, the service providing system can be applied to a service where the service cooperation source apparatus 3 holds data such as photos and the service cooperation destination apparatus 4 gets user approval to receive the data from the service cooperation source apparatus 3 and prints the data on a predetermined printer. Note that the service exemplified here is merely an example and the application is not limited thereto and thus the service providing system can be applied to various services.

The user terminal 1 is a computer apparatus used by a user and is, for example, a terminal such as a personal computer, a mobile phone, or a smartphone. The service request apparatus 2 is a server apparatus that includes a storage unit 2a, a determining unit 2b, and a request unit 2c and manages session information for when the user terminal 1 receives a service. The service cooperation source apparatus 3 is, for example, a server apparatus that holds user data of the user terminal 1, and receives a service request from the user terminal 1 and provides a service in cooperation with the service cooperation destination apparatus 4. The service cooperation destination apparatus 4 is, for example, a server apparatus that prints user data on a printer and provides the user with a service in cooperation with the service cooperation source apparatus 3.

First, the case in which the user terminal 1 uses a service will be described. The user terminal 1 Web-accesses the service cooperation source apparatus 3 through the service request apparatus 2 to request the service cooperation source apparatus 3 for a service. At this time, the service cooperation source apparatus 3 authenticates whether the user terminal 1 is a valid user. If the service cooperation source apparatus 3 authenticates that the user terminal 1 is a valid user, then the service cooperation source apparatus 3 allows the user terminal 1 to login to the service.

Subsequently, the service cooperation source apparatus 3 transmits an authentication request to the service cooperation destination apparatus 4, according to OAuth. The service cooperation destination apparatus 4 receives authentication information from the user terminal 1, etc., and performs user authentication and thereby authenticates that the user terminal 1 is a valid user. In this manner, in the service providing system, sessions for providing the service is established. In the case of FIG. 1, the service request apparatus 2 and the service cooperation source apparatus 3 establish a session, and the service request apparatus 2 and the service cooperation destination apparatus 4 establish a session.

Then, the service cooperation destination apparatus 4 and the service cooperation source apparatus 3 provide the user terminal 1 with the service in cooperation with each other. For example, the service cooperation destination apparatus 4 receives user data from the service cooperation source apparatus 3 and prints the user data on a predetermined printer. Thereafter, the user terminal 1 logs out from the service by a user's instruction operation.

At this time, the service request apparatus 2 stores cooperation source session information and cooperation destination session information in the storage unit 2a in association with a user identifier that identifies the user. Namely, the service request apparatus 2 maintains the sessions for providing the user terminal 1 with the service, without logging off the sessions. Note that the cooperation source session information is information on the session used by the service cooperation source apparatus 3 that is requested by the user for provision of the service. The cooperation destination session information is information on the session used by the service cooperation destination apparatus 4 that provides the user with the service in cooperation with the service cooperation source apparatus 3.

Thereafter, the user terminal 1, once having logged out, Web-accesses the service cooperation source apparatus 3 through the service request apparatus 2 to request the service cooperation source apparatus 3 for a service again. Namely, it is assumed that the user terminal 1 has logged in to the service again.

In this case, the determining unit 2b of the service request apparatus 2 determines whether the user identifier of the user terminal 1 requesting the service cooperation source apparatus 3 for provision of a service is stored in the storage unit 2a. If the determining unit 2b determines that the user identifier is stored, then the request unit 2c of the service request apparatus 2 requests the service cooperation source apparatus 3 for provision of a service using the sessions maintained. Specifically, the request unit 2c requests the service cooperation source apparatus 3 connected by the cooperation source session information stored in association with the user identifier, for provision of a service in cooperation with the service cooperation destination apparatus 4 connected by the cooperation destination session information associated with the cooperation source session information.

As such, the service providing system according to the first embodiment maintains session information used for provision of a service to the user terminal 1, even after the user terminal 1 logs out. Then, when the same user terminal 1 logs in again to request for the service, the service providing system according to the first embodiment provides the user terminal 1 with the service using maintained sessions. Therefore, at the second login, a verification phase in an OAuth process can be omitted. As a result, since an OAuth process can be prevented from becoming a bottleneck, degradation in processing performance can be suppressed.

[b] Second Embodiment

Although the first embodiment describes, as an example, a system configuration in which a user terminal performs authentication on each of a service cooperation source apparatus and a service cooperation destination apparatus, the configuration is not limited thereto. For example, a disclosed service request apparatus can also be applied to a system configuration in which proxy authentication is performed in place of a user terminal. Hence, a second embodiment describes, as an example, a system configuration using proxy authentication.

Overall Configuration

Figure 2:
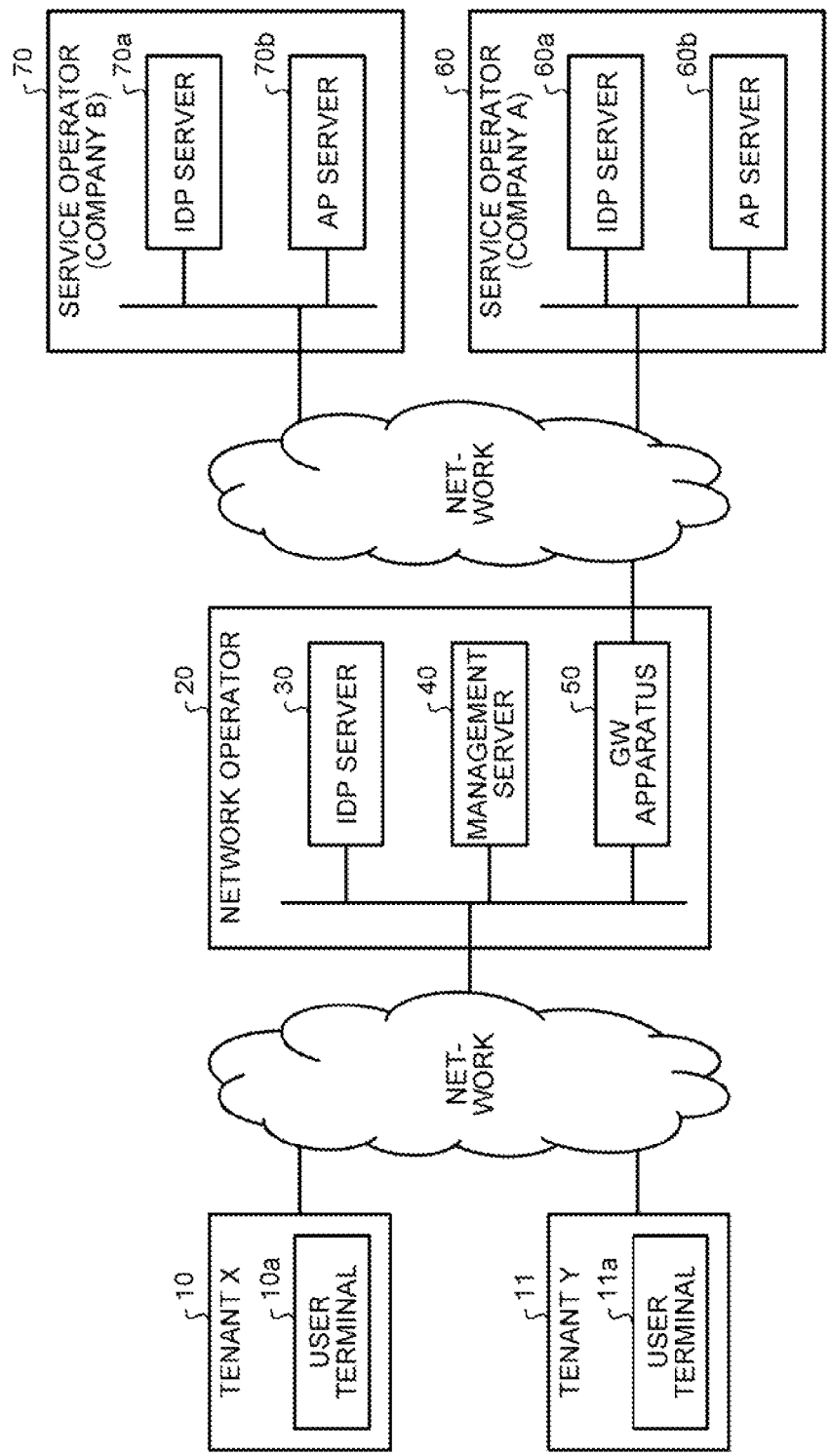
FIG. 2 is a diagram illustrating an exemplary overall configuration of a service providing system according to a second embodiment.

FIG. 2 is a diagram illustrating an exemplary overall configuration of a service providing system according to the second embodiment. As illustrated in FIG. 2, the service providing system includes a tenant X 10, a tenant Y 11, a network operator 20, a service operator (company A) 60, and a service operator (company B) 70. As in the first embodiment, apparatuses are connected to each other through a network. Note that there is no special relationship between the tenants and the operators and thus the operators may be different ones.

The tenant X 10 is an organization such as a corporation assigned "tenantX" as a tenant ID. Here, a user terminal 10a belongs to the tenant X 10. The tenant Y 11 is an organization such as a corporation assigned "tenantY" as a tenant ID. Here, a user terminal 11a belongs to the tenant Y 11.

The network operator 20 includes an IDP (Identity Provider) server 30, a management server 40, and a GW apparatus 50, by which proxy authentication and session management are performed on the user terminals. Note that the configuration of each apparatus, etc., will be described later.

In the service operator (company A) 60, an IDP server 60a and an AP server 60b are connected to each other through a router, etc., by which a service is provided to a user in cooperation with the service operator (company B) 70. The IDP server 60a performs authentication of a user who uses a service to be provided by the AP server 60b. The AP server 60b provides the service to the user having gained authentication from the IDP server 60a. For example, in response to a request from the user terminal 10a used by a user having gained authentication from the IDP server 60a, the AP server 60b performs a requested process.

In the service operator (company B) 70, an IDP server 70a and an AP server 70b are connected to each other through a router, etc., by which a service is provided to a user in cooperation with the service operator (company A) 60. The IDP server 70a performs authentication of a user who uses a service to be provided by the AP server 70b. The AP server 70b provides the service to the user having gained authentication from the IDP server 70a. For example, in response to a request from the user terminal 10a used by a user having gained authentication from the IDP server 70a, the AP server 70b performs a requested process.

Then, the IDP server 60a of the service operator (company A) 60 and the IDP server 70a of the service operator (company B) 70 can perform an access right delegation process. For example, the IDP server 70a can delegate the access right, of a user who uses the user terminal 10a to the AP server 70b, to the AP server 60b. This enables the AP server 60b to access the AP server 70b to use a service provided by the AP server 70b. For a protocol capable of performing such access right delegation, there is, for example, OAuth.

An example of a service that can be performed by access right delegation will be described. For example, it is assumed that a user of the user terminal 10a has stored his/her document data in the AP server 70b of the service operator (company B) 70. In addition, the AP server 60b of the service operator (company A) 60 can perform a service where the document data of the user of the user terminal 10a is converted into print data.

Specifically, when the user prints the content of his/her document data stored in the AP server 70b, the user performs, for example, an input to instruct to print the document data, using an operation panel of the user terminal 10a having a printer function. In response to the input, the user terminal 10a transmits a document data net print request to the AP server 60b. The net print request is transmitted to the AP server 60b. The AP server 60b accesses the AP server 70b using the access right provided to the user, to obtain the document data. Then, the AP server 60b converts the document data into print data and transmits the print data to the user terminal 10a. The user terminal 10a performs printing based on the received print data, and discharges paper documents having the content of the document data printed thereon.

To use such a service, delegation of the access right to the AP server 70b is performed on the AP server 60b. In that case, the GW (Gateway) apparatus 50 of the network operator 20 that performs user proxy authentication gains proxy authentication for using a service provided by the AP server 60b and gains proxy authentication for using a service provided by the AP server 70b. To do so, the GW apparatus 50 obtains a plurality of pieces of authentication information for using the services provided by the AP server 60b and the AP server 70b.

Configuration of the Network Operator

Figure 3:
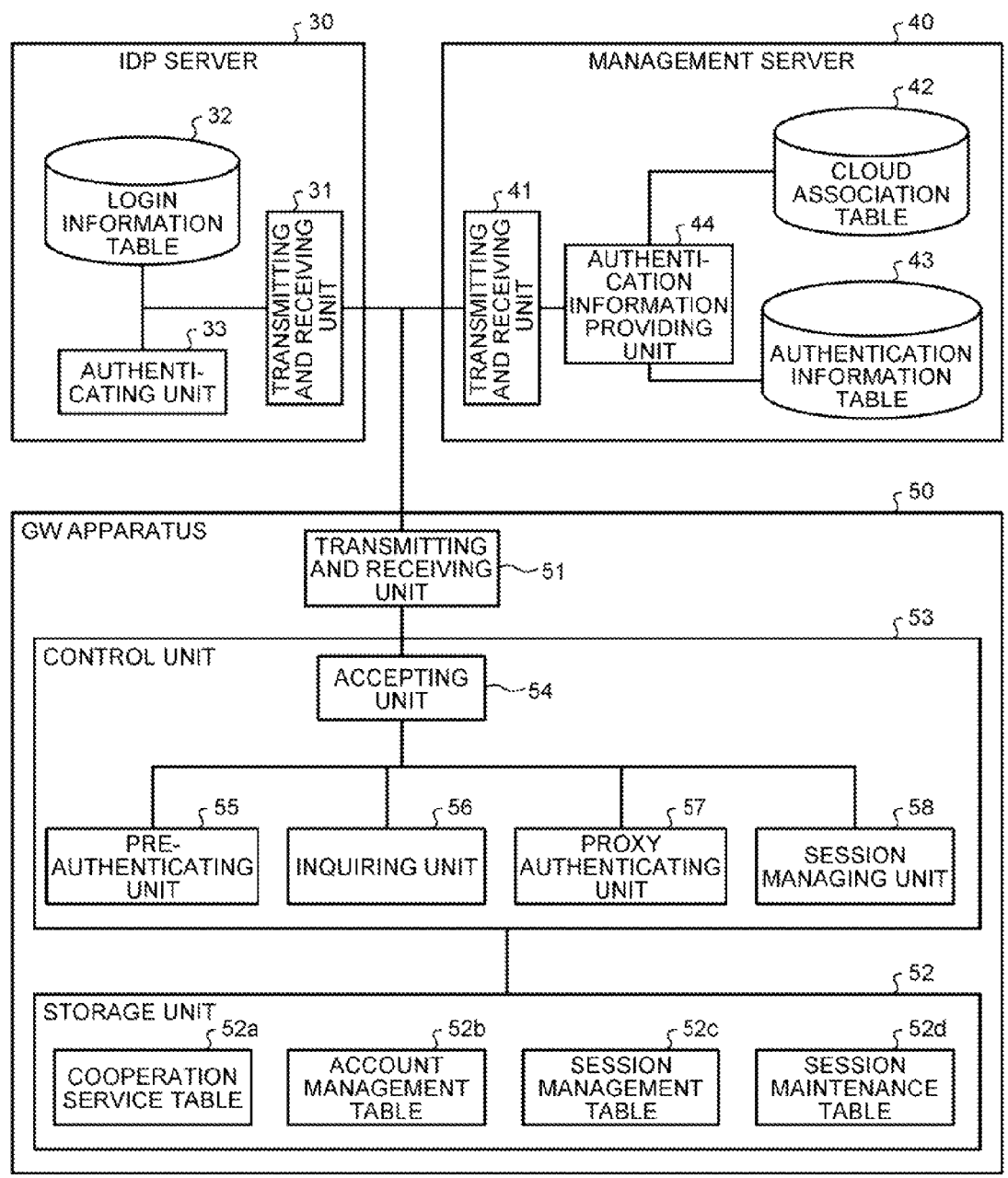
FIG. 3 is a functional block diagram illustrating a configuration of each apparatus included in a network operator.

Next, a configuration of each apparatus included in the network operator illustrated in FIG. 2 will be described. FIG. 3 is a functional block diagram illustrating a configuration of each apparatus included in the network operator. As illustrated in FIG. 3, the network operator includes the IDP server 30, the management server 40, and the GW apparatus 50. Here, a configuration of each apparatus will be described.

Configuration of the IDP Server

As illustrated in FIG. 3, the IDP server 30 includes a transmitting and receiving unit 31, a login information table 32, and an authenticating unit 33. The transmitting and receiving unit 31 is a processing unit that controls communication of other apparatuses and is, for example, a network interface card. For example, the transmitting and receiving unit 31 accepts a user name and a password from the user terminal 10a having accepted a login request. In addition, the transmitting and receiving unit 31 transmits an authentication result to the user terminal 10a.

The login information table 32 stores authentication information that authenticates a user. The login information table 32 is provided in, for example, a storage apparatus such as a memory or a hard disk. For example, the login information table 32 stores authentication information in which a "user ID" that identifies a user is associated with a "password" that identifies the user. The login information table 32 is updated by an administrator, etc., every time a password or a user ID is changed by a user, etc.

The authenticating unit 33 is a processing unit that performs user authentication. The authenticating unit 33 may be, for example, an electronic circuit such as a CPU (Central Processing Unit) or may be a processing unit performed by a CPU. For example, when the authenticating unit 33 accepts a login request from the user terminal 10a, the authenticating unit 33 allows the user terminal 10a to display a login screen. Then, the authenticating unit 33 accepts a "user ID" and a "password" on the login screen. Thereafter, the authenticating unit 33 determines whether the accepted "user ID" and "password" are stored in the login information table 32 in association with each other. If stored, then the authenticating unit 33 transmits, as a response, an authentication result indicating allowance for authentication, to the user terminal 10a. If not stored, then the authenticating unit 33 transmits, as a response, an authentication result indicating rejection of authentication, to the user terminal 10a. As such, the authenticating unit 33 performs pre-authentication on a user who uses the service providing system.

Configuration of the Management Server

As illustrated in FIG. 3, the management server 40 includes a transmitting and receiving unit 41, a cloud association table 42, an authentication information table 43, and an authentication information providing unit 44.

The transmitting and receiving unit 41 is a processing unit that controls communication with other apparatuses and is, for example, a network interface card. For example, the transmitting and receiving unit 41 receives a request to obtain authentication information from the GW apparatus 50 and transmits, as a response, corresponding authentication information.

The cloud association table 42 stores information on IDP servers of respective service operators. The cloud association table 42 is provided in, for example, a storage apparatus such as a memory or a hard disk. FIG. 4 is a diagram illustrating an example of information stored in the cloud association table 42 of the management server 40. As illustrated in FIG. 4, the cloud association table 42 stores "IDP_URL, service operator" in association with each other.

In the "IDP_URL" stored here, a URL (Uniform Resource Locator) of an IDP server which is owned by a service operator is set. In the "service operator", an operator name or identifier of the service operator is set. The example of FIG. 4 illustrates that the IDP_URL of "company A" is "https://IDP1.com".

The authentication information table 43 is a table provided for each service operator, and stores authentication information of users in the tenants. The authentication information table 43 is provided in, for example, a storage apparatus such as a memory or a hard disk. FIG. 5 is a diagram illustrating an example of information stored in the authentication information table 43 of the management server 40. As illustrated in FIG. 5, the authentication information table 43 stores authentication information table groups in which "tenant ID, user ID, company ID, company password" are associated with one another for each service operator. The authentication information table 43 is updated by an administrator, etc., every time a password or a user ID is changed by a user, etc.

Now, using company A as an example, information stored in the authentication information table 43 will be described. In the "tenant ID", identification information of a tenant that receives provision of a service from the service operator is set. In the "user ID", identification information of a user belonging to the tenant indicated by the tenant ID is set. In the "company A's ID", a user ID of the tenant which is registered in the IDP server of the service operator A is set. In the "company A's password", a password for authentication in the IDP server of the service operator A is set. The example of FIG. 5 illustrates that "user001" belonging to "tenantX" is allowed for authentication by the IDP server of the service operator A, with "a_ID" and "a_PW".

The authentication information providing unit 44 is a processing unit that responds to an inquiry about authentication information. The authentication information providing unit 44 may be, for example, an electronic circuit such as a CPU or may be a processing unit performed by a CPU. Specifically, the authentication information providing unit 44 receives an inquiry about authentication information from the GW apparatus 50, obtains corresponding information from the cloud association table 42 and the authentication information table 43, and transmits, as a response, the information to the GW apparatus 50. For example, the authentication information providing unit 44 receives an inquiry including a set of a tenant name, a user ID, and a URL of at least one IDP server. Then, the authentication information providing unit 44 obtains information corresponding to a combination of the pieces of information included in the received inquiry, from the cloud association table 42 and the authentication information table 43 and transmits, as a response, the information to the GW apparatus 50.

Configuration of the GW Apparatus

As illustrated in FIG. 3, the GW apparatus 50 includes a transmitting and receiving unit 51, a storage unit 52, and a control unit 53. The storage unit 52 is a storage apparatus such as a memory or a hard disk. The control unit 53 is an electronic circuit such as a CPU or an integrated circuit.

The transmitting and receiving unit 51 is a processing unit that controls communication with other apparatuses and is, for example, a network interface card. The transmitting and receiving unit 51 receives messages, packets, and data from external apparatuses and outputs them to an accepting unit 54. In addition, the transmitting and receiving unit 51 transmits messages, packets, and data outputted from the accepting unit 54, to destination external apparatuses.

The storage unit 52 is a storage apparatus that stores a program executed by the control unit 53 and data, and includes a cooperation service table 52a, an account management table 52b, a session management table 52c, and a session maintenance table 52d.

The cooperation service table 52a stores, for each service, URLs of IDP servers which are objects to gain authentication. The cooperation service table 52a is updated by the control unit 53, an administrator, etc. FIG. 6 is a diagram illustrating an example of information stored in the cooperation service table 52a of the GW apparatus 50. As illustrated in FIG. 6, the cooperation service table 52a stores "tenant ID, service URL, IDP_URL, cooperation destination's IDP_URL" in association with one another.

In the "tenant ID" stored here, an ID of a tenant to which a user using a user terminal having transmitted a service request message belongs is set. In the "service URL", a URL of an AP server which is the destination of the service request message is set. In the "IDP_URL", a URL of an IDP server that performs user authentication on the user who receives provision of a service from the AP server which is the destination of the service request message is set. In the "cooperation destination's IDP_URL", a URL of an IDP server that performs user authentication on the user who receives provision of a service from another AP server that performs a process in cooperation with the AP server which is the destination of the service request message is set.

An example of FIG. 6 illustrates that for a service request message from a user belonging to "tenantX" to "https://service1.com", "https://IDP1.com" serving as a cooperation source performs an authentication process, and "https://IDP2.com" serving as a cooperation destination performs an authentication process.

Referring back to FIG. 3, the account management table 52b stores, for each user, authentication information for gaining authentication from an IDP server for each service. The account management table 52b is updated by the control unit 53. FIG. 7 is a diagram illustrating an example of information stored in the account management table 52b of the GW apparatus 50. As illustrated in FIG. 7, the account management table 52b stores "tenant ID, user ID, service URL, IDP_URL, ID, PW" in association with one another.

In the "tenant ID" stored here, a tenant ID of a tenant to which a user using a user terminal having transmitted a service request message belongs is set. In the "user ID", a user ID of the user using the user terminal having transmitted the service request message is set. In the "service URL", a URL of an AP server that provides a service is set. In the "IDP_URL", a URL of an IDP that performs authentication is set. In the "ID", a user ID used for the authentication is set. In the "PW", a password used for the authentication is set.

An example of FIG. 7 illustrates that "user001" belonging to "tenantX" is allowed for authentication at "https://IDP1.com"'d with "a_ID, a_PW", and is provided with a service from "https://service1.com". Likewise, "user001" belonging to "tenantX" is allowed for authentication at "https://IDP2.com" with "b_ID and b_PW", and is provided with a service from "https://service2.com".

Referring back to FIG. 3, the session management table 52c stores session information for a service being provided. The session management table 52c manages sessions where a service is provided. When a service is completed, corresponding service session information is deleted. FIG. 8 is a diagram illustrating an example of information stored in the session management table 52c of the GW apparatus 50. As illustrated in FIG. 8, the session management table 52c stores "user session ID, tenant ID, user ID, service URL (cooperation source), cooperation source's session ID, service URL (cooperation destination), cooperation destination's session ID" in association with one another.

In the "user session ID" stored here, an identifier that identifies an entry, i.e., session information, in the session management table 52c is set. In the "tenant ID", a tenant ID of a tenant to which a user receiving a service belongs is set. In the "user ID", a user ID of the user receiving the service is set. In the "service URL (cooperation source)", a URL of an AP server that receives a service request from the user and provides the user with the service is set. In the "cooperation source's session ID", a session identifier that identifies a session used by the AP server set as the service URL (cooperation source) to provide the service is set. In the "service URL (cooperation destination)", a URL of an AP server that provides the user with the service in cooperation with the AP server having received the service request from the user is set. In the "cooperation destination's session ID", a session identifier that identifies a session used by the AP server set as the service URL (cooperation destination) to provide the service is set. Note that each session is a session established between each AP server and the GW apparatus 50.

An example of FIG. 8 illustrates that "user001" belonging to "tenantX" receives a service in a state in which "https://service1.com" uses a session identified by "yyyyy" and "https://service2.com" uses a session identified by "zzzzz".

The session maintenance table 52d stores information about sessions where a user receives provision of a service, when the user logs out. The session maintenance table 52d is updated by the control unit 53. FIG. 9 is a diagram illustrating an example of information stored in the session maintenance table 52d of the GW apparatus 50. As illustrated in FIG. 9, the session maintenance table 52d stores "service URL, ID, session ID, state, cooperation destination" in association with one another.

In the "service URL" stored here, a URL of an AP server having provided a user with a service is set. In the "ID", a user ID of the user having received provision of the service is set. In the "session ID", a session ID of a session used to provide the service is set. In the "state", whether the user is in a login state or a logout state is set. In the "cooperation destination", a URL of another AP server is set when the service is provided to the user in cooperation with another AP server.

An example of FIG. 9 illustrates that "https://service1.com" provides the user "a_ID" with a service in cooperation with "https://service2.com", using a session identified by "yyyyy", and "a_ID" is still logged in at the present time. Likewise, an example of FIG. 9 illustrates that "https://service2.com" provides the user "b_ID" with a service in cooperation with "https://service1.com", using a session identified by "zzzzz", and "b_ID" is still logged in at the present time. Here, as can also be seen by comparison of FIGS. 8 and 9, the session maintenance table 52d stores information on a service cooperation source having been requested by a user for a service, and information on a service cooperation destination having been requested by the service cooperation source for a service in cooperation.

Referring back to FIG. 3, the control unit 53 is a processing unit that controls the entire process of the GW apparatus 50, and includes the accepting unit 54, a pre-authenticating unit 55, an inquiring unit 56, a proxy authenticating unit 57, and a session managing unit 58.

The accepting unit 54 is a processing unit that determines the type of a message accepted by the transmitting and receiving unit 51 and outputs the message to an appropriate processing unit. In addition, the accepting unit 54 is a processing unit that transmits messages outputted from other processing units, to their destinations through the transmitting and receiving unit 51.

For example, the accepting unit 54 refers to a header, etc., of a received message and when the message is a requesting request that requests a service, the accepting unit 54 outputs the message to the pre-authenticating unit 55. When the received message is a logout request, the accepting unit 54 outputs the message to the session managing unit 58. When the received message is a redirection request by an authentication request, an authentication information request, or an access allowance request, the accepting unit 54 outputs the message to the proxy authenticating unit 57.

The pre-authenticating unit 55 is a processing unit that performs pre-authentication on a user. Specifically, the pre-authenticating unit 55 determines whether an accessing user terminal is in a login state, and if not in a login state, then the pre-authenticating unit 55 allows transition to a login process. For example, the pre-authenticating unit 55 determines whether a service request message inputted from the accepting unit 54 has been authenticated. Then, if the service request message has not been authenticated, i.e., if a user is not being logged in, then the pre-authenticating unit 55 transmits to a user terminal which is the request source, a message allowing transition to an authentication process performed by the IDP server 30.

Note that when a user is properly authenticated by the IDP server 30, the pre-authenticating unit 55 obtains information indicating that the user has been properly authenticated, from the IDP server 30. The information indicating that the user has been properly authenticated is a user ID, a password, etc., for which authentication is allowed. Note that the information is included in, for example, another service request message from a user terminal that requests a service. At this time, the information may be encrypted. In addition, the IDP server 30 can use an authentication system such as OpenID.

The inquiring unit 56 is a processing unit that inquires the management server 40 about authentication information used to create the account management table 52b. For example, when an unauthenticated service request message is inputted to the inquiring unit 56 from the pre-authenticating unit 55, the inquiring unit 56 inquires the management server 40 about authentication information to create an entry in the account management table 52b from the results of a response to the inquiry.

As an example, the inquiring unit 56 receives a service request message including "tenant ID, user ID, service URL". The inquiring unit 56 then identifies "IDP_URL, cooperation destination's IDP_URL" associated with the received "tenant ID, service URL" from the cooperation service table 52a. Then, the inquiring unit 56 transmits to the management server 40 an authentication information inquiry request including the received "tenant ID, user ID" and the identified "IDP_URL, cooperation destination's IDP_URL".

Then, the authentication information providing unit 44 of the management server 40 identifies an authentication information table corresponding to the received "IDP_URL, cooperation destination's IDP_URL" from the authentication information table 43. Subsequently, the authentication information providing unit 44 identifies "ID, password" associated with the received "tenant ID, service URL" from each authentication information table 43 and transmits, as a response, the "ID, password" to the GW apparatus 50.

Thereafter, the inquiring unit 56 creates an entry including "tenant ID, user ID, service URL, IDP_URL, ID, password (PW)" associated with one another, and stores the entry in the account management table 52b. At this time, when there is a cooperation destination's IDP_URL associated with the service URL included in the service request message received from the user, the inquiring unit 56 creates an entry for a service cooperation source and a service cooperation destination, respectively. Note that the inquiring unit 56 can identify a URL of the service cooperation destination from the cooperation service table 52a, using, as a key, the cooperation destination's IDP_URL received from the management server 40.

Referring back to FIG. 3, the proxy authenticating unit 57 is a processing unit that handles user authentication performed by each service operator, in place of a user terminal. Namely, the proxy authenticating unit 57 is a processing unit that performs proxy authentication of a user terminal. Specifically, in response to an inquiry about authentication information transmitted from an IDP server of a service operator, the proxy authenticating unit 57 transmits, as a response, a corresponding ID and PW.

For example, when the IDP server 60a of the service operator (company A) 60 requests the proxy authenticating unit 57 for authentication information, the proxy authenticating unit 57 identifies the IDP_URL of the IDP server 60a "https://IDP1.com" from the request. Then, the proxy authenticating unit 57 searches the account management table 52b using the identified IDP_URL "https://IDP1.com" as a key, and extracts the ID "a_ID" and the PW "a_PW". Thereafter, the proxy authenticating unit 57 transmits, as a response, the ID "a_ID" and the PW "a_PW" to the IDP server 60a of the service operator (company A) 60, as authentication information.

The session managing unit 58 is a processing unit that manages session information at login and maintains sessions for a predetermined period of time after logout. Specifically, while a user logs in and is provided with a service, the session managing unit 58 collects various information about the service to create an entry and stores the entry in the session management table 52c. Then, when the user logs out, the session managing unit 58 obtains pieces of session information of a service cooperation source and a service cooperation destination that provide the user with the service, from the session management table 52c and the account management table 52b, and stores the pieces of session information in the session maintenance table 52d. Thereafter, when the user being managed in the session maintenance table 52d logs in again, the session managing unit 58 requests the AP servers of the respective service operators for provision of a service by sessions maintained.

That is, when a user being managed in the session maintenance table 52d logs in again, the session managing unit 58 omits proxy authentication performed by the proxy authenticating unit 57 and provides the user with a service.

Now, a process of creating, by the session managing unit 58, an entry in the session management table 52c when a user being logged in is receiving provision of a service will be described. For example, the session managing unit 58 obtains a "tenant ID", a "user ID", and a "service URL (cooperation source)" from the account management table 52b. In addition, the session managing unit 58 obtains a "cooperation source's session ID" from a packet transmitted from an AP server corresponding to the service URL (cooperation source) to a user terminal or from a session established between the AP server and the GW apparatus 50.

In addition, the session managing unit 58 can obtain a "service URL (cooperation destination)" by searching the cooperation service table 52a using the "service URL (cooperation source)" as a key. In addition, the session managing unit 58 obtains a "cooperation destination's session ID" from a packet transmitted from an AP server corresponding to the service URL (cooperation destination) to the user terminal or from a session established between the AP server and the GW apparatus 50.

Then, the session managing unit 58 stores an entry where the above-described pieces of information are associated with one another, in the session management table 52c. Note that the session managing unit 58 assigns an arbitrary "user session ID" to the entry, as information identifying the entry.

Next, a process of creating, by the session managing unit 58, entries in the session maintenance table 52d for a user having requested logout will be described. The session managing unit 58 creates entries in the session maintenance table 52d for both of a cooperation source and a cooperation destination. That is, the relationship between the cooperation source and the cooperation destination is a relationship when viewed from one side. Thus, when viewed from either side, either one can serve as the cooperation source or the cooperation destination. Specifically, it is assumed that a user terminal transmits a service request to the service operator (company A), and the AP server of company A provides a service in cooperation with the AP server of company B. In this case, when viewed from company A, the AP server of company A is the cooperation source and the AP server of company B is the cooperation destination. On the other hand, even in this case, when viewed from company B, the AP server of company B is the cooperation source and the AP server of company A is the cooperation destination. Hence, the session managing unit 58 creates entries for both of the cooperation source and the cooperation destination. As a result, the GW apparatus 50 can maintain each session used in service-to-service cooperation.

An example of a service providing source will be described. The session managing unit 58 identifies an entry corresponding to a user ID of a user using the user terminal 10a having requested logout, from the session management table 52c. Subsequently, the session managing unit 58 stores a "service URL (cooperation source)", a "cooperation source's session ID", and a "service URL (cooperation destination)" included in the identified entry, in the "service URL", the "session ID", and the "cooperation destination", respectively. In addition, the session managing unit 58 stores, in the "ID", an "ID" which is stored in the account management table 52b in association with the "service URL". Note that the "ID" may be a "user ID" which is stored in the account management table 52b in association with the "service URL (cooperation source)", i.e., a "user ID" having requested logout. Then, the session managing unit 58 stores an entry where the above-described pieces of obtained information are associated with a login state, in the session maintenance table 52d.

Next, an example of a service providing destination will be described. The session managing unit 58 identifies an entry corresponding to a user ID of a user using the user terminal 10a having requested logout, from the session management table 52c. Subsequently, the session managing unit 58 stores a "service URL (cooperation destination)", a "cooperation destination's session ID", and a "service URL (cooperation source)" included in the identified entry, in the "service URL", the "session ID", and the "cooperation destination", respectively. In addition, the session managing unit 58 stores, in the "ID", a "ID" which is stored in the account management table 52b in association with the "service URL". Note that the "ID" may be a "user ID" which is stored in the account management table 52b in association with the "service URL (cooperation destination)", i.e., a "user ID" having requested logout. Then, the session managing unit 58 stores an entry where the above-described pieces of obtained information are associated with a login state, in the session maintenance table 52d.

Flow of a Process

Next, the flow of a process performed by the GW apparatus 50 according to the second embodiment will be described. Here, the overall flow and the flow of each process performed for each message will be described.

Overall Flow

Figure 10:
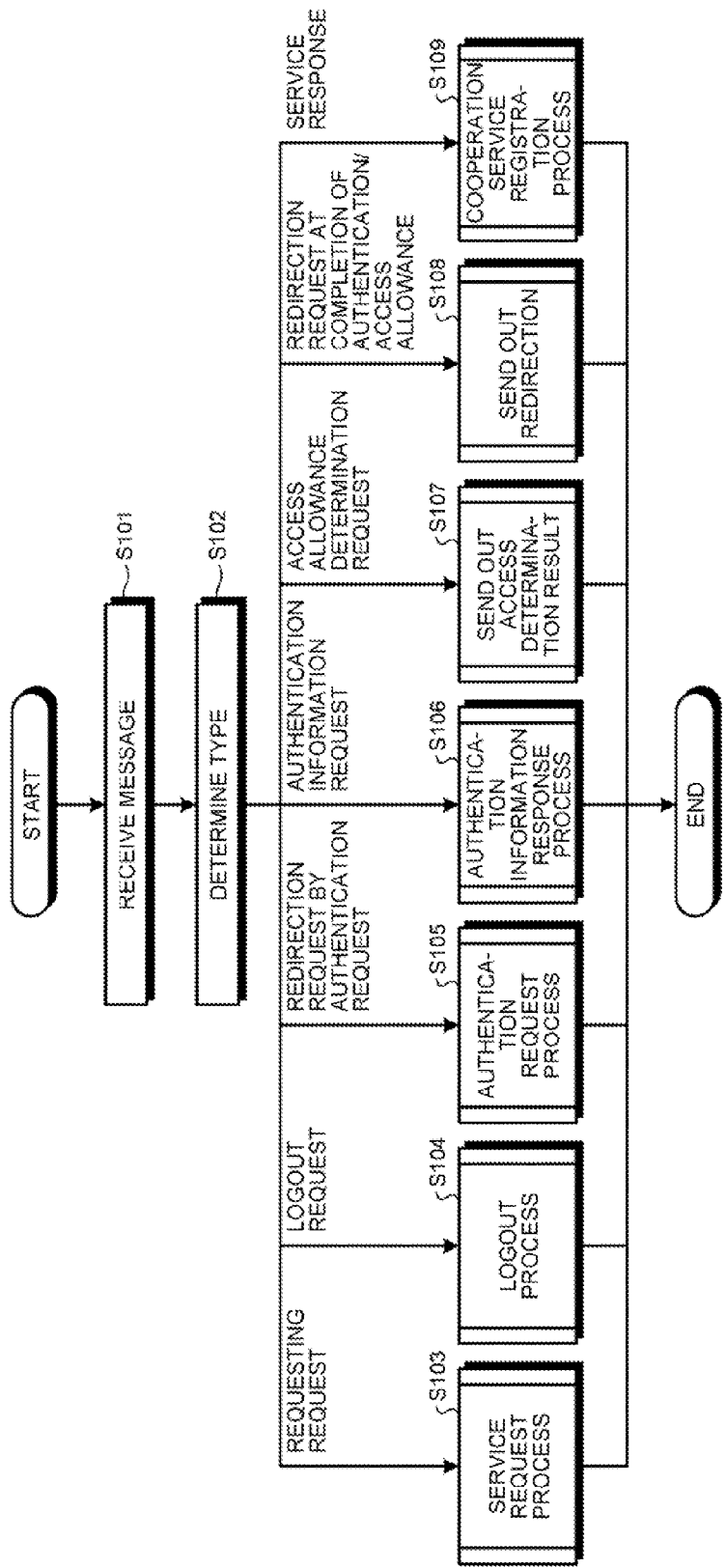
FIG. 10 is a flowchart illustrating the flow of a process performed by the GW apparatus according to the second embodiment.

FIG. 10 is a flowchart illustrating the flow of a process performed by the GW apparatus 50 according to the second embodiment. As illustrated in FIG. 10, when the transmitting and receiving unit 51 of the GW apparatus 50 receives a service request message (S101), the accepting unit 54 determines the type of the received service request message (S102).

When the accepting unit 54 determines that the service request message is a requesting request, the pre-authenticating unit 55, etc., perform a service request process (S103). When the accepting unit 54 determines that the service request message is a logout request, the session managing unit 58 performs a logout process (S104).

When the accepting unit 54 determines that the service request message is a redirection request by an authentication request, the proxy authenticating unit 57, etc., perform an authentication request process (S105). When the accepting unit 54 determines that the service request message is an authentication information request, the proxy authenticating unit 57, etc., perform an authentication information response process (S106).

When the accepting unit 54 determines that the service request message is an access allowance determination request, the proxy authenticating unit 57, etc., send out an access determination result to a request source (S107). Namely, the proxy authenticating unit 57, etc., generate an access allowance request message including a cached OAuth code, and transmit the access allowance request message to the request source through the accepting unit 54 and the transmitting and receiving unit 51.

When the accepting unit 54 determines that the service request message is a redirection request at the completion of authentication or access allowance, the accepting unit 54, etc., send out a redirection (S108). Namely, the accepting unit 54, etc., transmit a message by redirection, according to a redirection instruction of the received message. For example, if the message is an authentication result message indicating the success of authentication, then the accepting unit 54, etc., transmit an authentication result to a redirection destination as an authenticated service request message, according to a redirection instruction. When the message is an authentication succeeded authentication result message, the accepting unit 54, etc., transmit an authentication result to a redirection destination as an allowance completion notification message, according to a redirection instruction.

When the accepting unit 54 determines that the service request message is a service response, the control unit 53 performs a cooperation service registration process (S109).

Service Request Process

Figure 11:
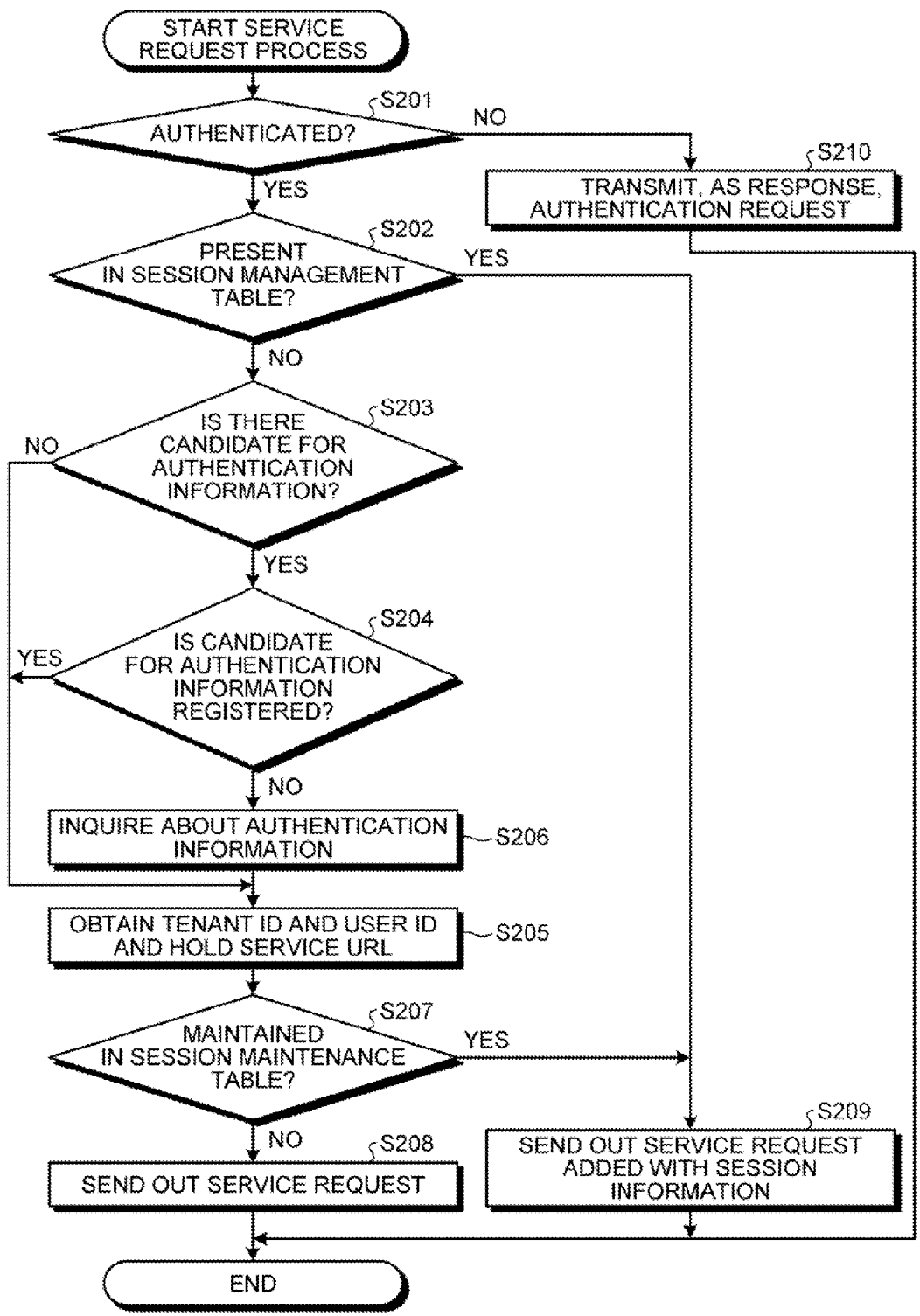
FIG. 11 is a flowchart illustrating the flow of a service request process performed by the GW apparatus according to the second embodiment.

FIG. 11 is a flowchart illustrating the flow of a service request process performed by the GW apparatus 50 according to the second embodiment. As illustrated in FIG. 11, the pre-authenticating unit 55 determines whether a received requesting request has been authenticated (S201). For example, when the requesting request includes an identifier or the like that indicates that the requesting request has been authenticated, the pre-authenticating unit 55 determines that the requesting request has been authenticated. The identifier is added by an IDP server having performed an authentication process.

Subsequently, if it is determined that the requesting request has been authenticated (Yes at S201), then the session managing unit 58 determines whether a user identifier of a user having transmitted the requesting request is stored in the session management table 52c (S202). That is, the session managing unit 58 determines whether the user who is the requesting request source is being logged in. For example, the session managing unit 58 determines that the user is being logged in, when the session management table 52c has a user ID that is included in the requesting request.

Then, if it is determined that the user identifier of the user having transmitted the requesting request is not stored in the session management table 52c (No at S202), then the proxy authenticating unit 57 performs S203. That is, if it is determined that sessions have not been established, then the proxy authenticating unit 57 performs S203. Specifically, the proxy authenticating unit 57 determines whether an entry corresponding to a set of "tenant ID, service URL" included in the received message is stored in the cooperation service table 52a. Then, if there is a corresponding entry, then the proxy authenticating unit 57 extracts an "IDP_URL" and a "cooperation destination's IDP_URL" from the entry. Thereafter, the proxy authenticating unit 57 generates the "tenant ID, service URL, IDP_URL" and the "tenant ID, service URL, cooperation destination's IDP_URL" as authentication information candidates, and determines that there exists authentication information.

Subsequently, if the proxy authenticating unit 57 determines that there exists authentication information (Yes at S203), then the proxy authenticating unit 57 determines whether the authentication information is registered in the account management table 52b (S204). Namely, the proxy authenticating unit 57 determines whether the account management table 52b has entries corresponding to the "tenant ID, service URL, IDP_URL" and "tenant ID, service URL, cooperation destination's IDP_URL" which are generated at S203. If it is determined that there exists no authentication information (No at S203), then the GW apparatus 50 performs S205 without performing S204.

Then, if the proxy authenticating unit 57 determines that there are entries corresponding to both sets (Yes at S204), then the proxy authenticating unit 57 holds the "tenant ID, user ID" and the "service URL" as cache data (S205). Specifically, the proxy authenticating unit 57 obtains "tenant ID, user ID" from the received message. Further, the proxy authenticating unit 57 obtains a "service URL" associated with the obtained "tenant ID, user ID", from the account management table 52b, etc. Then, the proxy authenticating unit 57 holds the "tenant ID, user ID, service URL" as cache data.

On the other hand, if the proxy authenticating unit 57 determines that there are no entries corresponding to both sets or an entry corresponding to either set (No at S204), then the inquiring unit 56 performs S206. Specifically, the inquiring unit 56 transmits to the management server 40 an inquiry message including the set(s) whose corresponding entry(ies) has been determined not to exist, and receives, as a response thereto, authentication information including an ID(s) and a password(s). For example, the inquiring unit 56 transmits "tenant ID, service URL, IDP_URL" to the management server 40. The management server 40 obtains "ID, password" associated with the received set, from the authentication information table 43 and transmits, as a response, the "ID, password" to the GW apparatus 50. Then, the inquiring unit 56 associates the transmitted "tenant ID, service URL, IDP_URL" with the received "ID, password" and stores them in the account management table 52b. Thereafter, S205 is performed.

Thereafter, the session managing unit 58 determines whether the user ID of the user having transmitted the message is stored in the session maintenance table 52d (S207). For example, the session managing unit 58 identifies an "ID" associated with the "tenant ID, user ID, service URL" generated at S203 or the "tenant ID, service URL" extracted at S202, from the account management table 52b. Then, the session managing unit 58 determines whether the identified "ID" is stored in the session maintenance table 52d. At this time, the session managing unit 58 may further determine whether the "service URLs" match.

Then, if the session managing unit 58 determines that the user ID is not stored in the session maintenance table 52d (No at S207), then the proxy authenticating unit 57 sends out a service request (S208). For example, the proxy authenticating unit 57 transmits a service request to the "service URL" cached at S205, i.e., the "service URL" included in the service request message.

On the other hand, if the session managing unit 58 determines that the user ID is stored in the session maintenance table 52d (Yes at S207), then the session managing unit 58 sends out a service request added with session information (S209). For example, the session managing unit 58 requests an AP server of a service cooperation source connected with use of "session ID" associated with the user ID, for a service. At this time, the session managing unit 58 identifies a "cooperation destination" associated with the "session ID" from the session maintenance table 52d, and further identifies a "session ID" associated with the "cooperation destination". Then, the session managing unit 58 requests provision of a service in cooperation with a service cooperation destination connected with use of the identified "session ID", i.e., "coordination destination's session ID".

If the session managing unit 58 determines, at S202, that the user identifier of the user having transmitted the requesting request is stored in the session management table 52c (Yes at S202), then the session managing unit 58 performs S209. That is, if the session managing unit 58 determines that sessions have been established, then the session managing unit 58 performs S209.

If it is determined at S201 that the requesting request has not been authenticated (No at S201), then the pre-authenticating unit 55 performs S210. Specifically, the pre-authenticating unit 55 transmits, as a response, an authentication request message to a user terminal which is the request source of the service request message. For example, the pre-authenticating unit 55 generates an authentication request message and outputs the authentication request message to the accepting unit 54. The accepting unit 54 transmits the inputted authentication request message to the destination user terminal through the transmitting and receiving unit 51. When S208, S209, and S210 are performed, the GW apparatus 50 ends the service request process.

Logout Process

Figure 12:
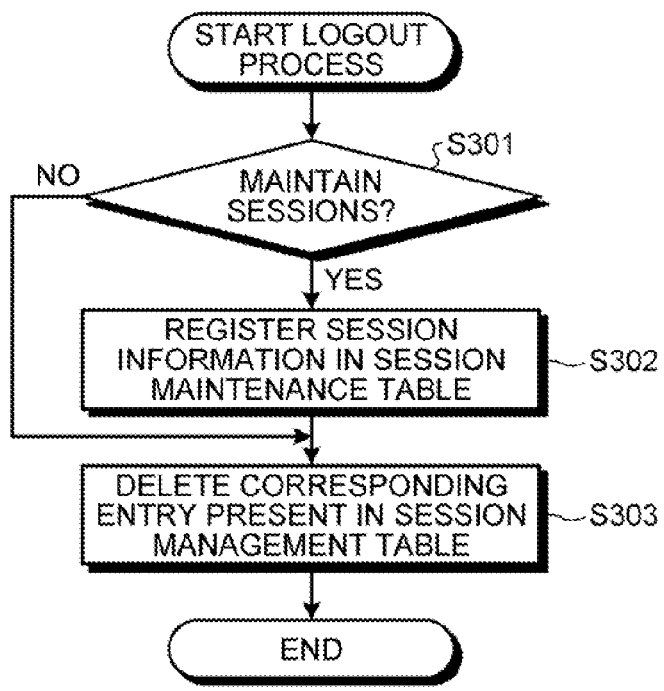
FIG. 12 is a flowchart illustrating the flow of a logout process performed by the GW apparatus according to the second embodiment.

FIG. 12 is a flowchart illustrating the flow of a logout process performed by the GW apparatus 50 according to the second embodiment. As illustrated in FIG. 12, when the session managing unit 58 receives a logout request, the session managing unit 58 determines whether to maintain sessions used by a user who has requested logout (S301).

For example, the session managing unit 58 extracts a user ID from the logout request and identifies a service URL associated with the user ID from the session management table 52c. Then, the session managing unit 58 determines whether to maintain sessions, by the type of a service provided by the identified service URL. As an example, when the type of a service is a download service, the session managing unit 58 determines to maintain sessions, and when the type of a service is a data storage service, the session managing unit 58 determines to abandon sessions, etc.

Then, if the session managing unit 58 determines to maintain the sessions (Yes at S301), then the session managing unit 58 registers session information in the session maintenance table 52d (S302).

For example, the session managing unit 58 identifies an entry corresponding to the user ID extracted from the logout request, from the session management table 52c. Then, the session managing unit 58 stores entries in the session maintenance table 52d, using information included in the identified entry, etc.

Thereafter, the session managing unit 58 deletes the entry corresponding to the user ID extracted from the logout request, from the session management table 52c (S303). If, at S301, the session managing unit 58 determines not to maintain the sessions used by the user who has requested logout (No at S301), then the session managing unit 58 performs S303. When S303 is performed, the GW apparatus 50 ends the logout process.

Authentication Request Process

Figure 13:
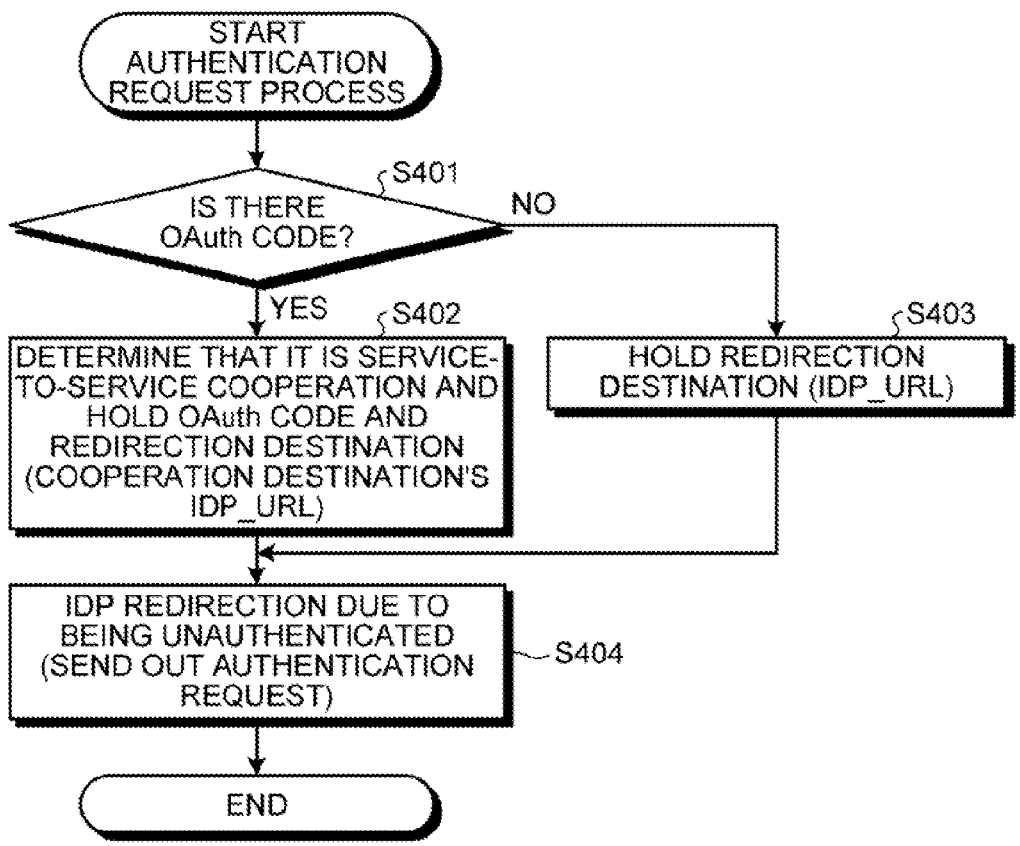
FIG. 13 is a flowchart illustrating the flow of an authentication request process performed by the GW apparatus according to the second embodiment.

FIG. 13 is a flowchart illustrating the flow of an authentication request process performed by the GW apparatus 50 according to the second embodiment.

As illustrated in FIG. 13, when the proxy authenticating unit 57 receives an authentication request message involving redirection, the proxy authenticating unit 57 determines whether the message includes an OAuth code (S401). For example, the proxy authenticating unit 57 determines whether the authentication request message includes an OAuth code. An authentication request message including an OAuth code corresponds to an allowance request message in OAuth.

Then, if the proxy authenticating unit 57 determines that the authentication request message includes an OAuth code (Yes at S401), then the proxy authenticating unit 57 determines that it is service-to-service cooperation, and thus holds the OAuth code and a redirection destination (S402). For example, the proxy authenticating unit 57 holds the OAuth code and a URL of a cooperation destination's IDP server which is a URL of the redirection destination.

On the other hand, if the proxy authenticating unit 57 determines that the authentication request message does not include an OAuth code (No at S401), then the proxy authenticating unit 57 obtains a URL of a cooperation source's IDP server which is a URL of a redirection destination, from the message and holds the URL (S403).

After performing S402 and S403, since an authentication process for using a service has not been performed, the proxy authenticating unit 57 transmits the message to an appropriate IDP server by instructed redirection (S404). When S404 is performed, the GW apparatus 50 ends the authentication request process.

Authentication Information Response Process

Figure 14:
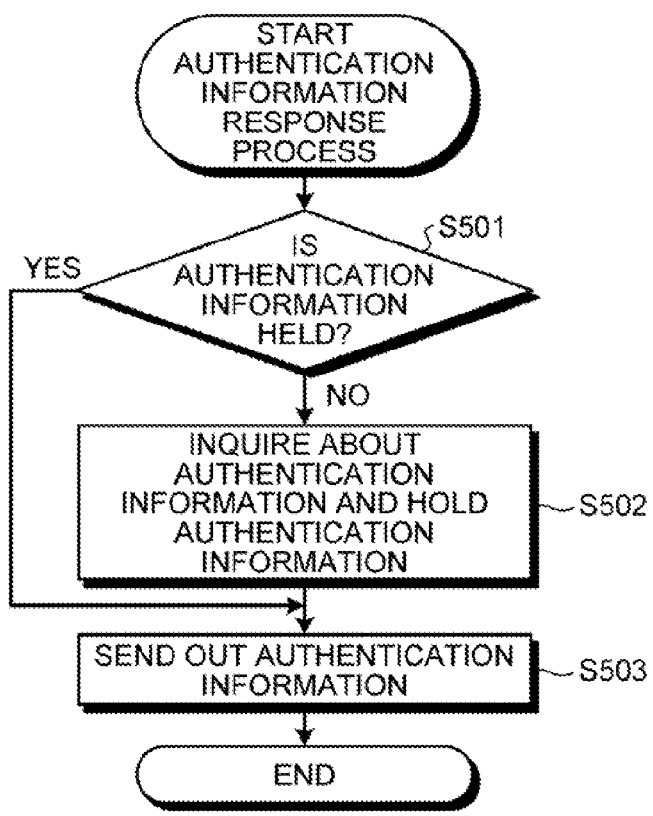
FIG. 14 is a flowchart illustrating the flow of an authentication information response process performed by the GW apparatus according to the second embodiment.

FIG. 14 is a flowchart illustrating the flow of an authentication information response process performed by the GW apparatus 50 according to the second embodiment.

As illustrated in FIG. 14, when the proxy authenticating unit 57 of the GW apparatus 50 receives a service request message indicating an authentication information request, the proxy authenticating unit 57 determines whether requested authentication information is held (S501). For example, the proxy authenticating unit 57 determines whether a set of requested "tenant ID, user ID, IDP's URL" is stored in the account management table 52b.

Then, if the proxy authenticating unit 57 determines that the authentication information is not held (No at S501), then the inquiring unit 56 inquires the management server 40 about the requested authentication information, and the proxy authenticating unit 57 allows the authentication information obtained by the inquiry to be held (S502). For example, the inquiring unit 56 inquires the management server 40 about the requested "tenant ID, user ID, IDPs' URLs" and obtains the "tenant ID, user ID, IDPs' URLs" and "IDs, passwords" associated therewith, from the management server 40. Note that the "IDs, passwords" here correspond, in the authentication information table 43, to IDs and passwords in respective companies. Then, the proxy authenticating unit 57 associates the obtained "tenant ID, user ID, IDPs' URLs" and "IDs, passwords" with one another and stores them in the account management table 52b.

Thereafter, the proxy authenticating unit 57 sends out authentication information to an authentication information request source (S503). For example, the proxy authenticating unit 57 identifies entries corresponding to the requested "tenant ID, user ID, IDPs' URLs" from the account management table 52b. Then, the proxy authenticating unit 57 sends out "IDs, PWs" included in the identified entries to the request source through the accepting unit 54 and the transmitting and receiving unit 51.

Cooperation Service Registration Process

Figure 15:
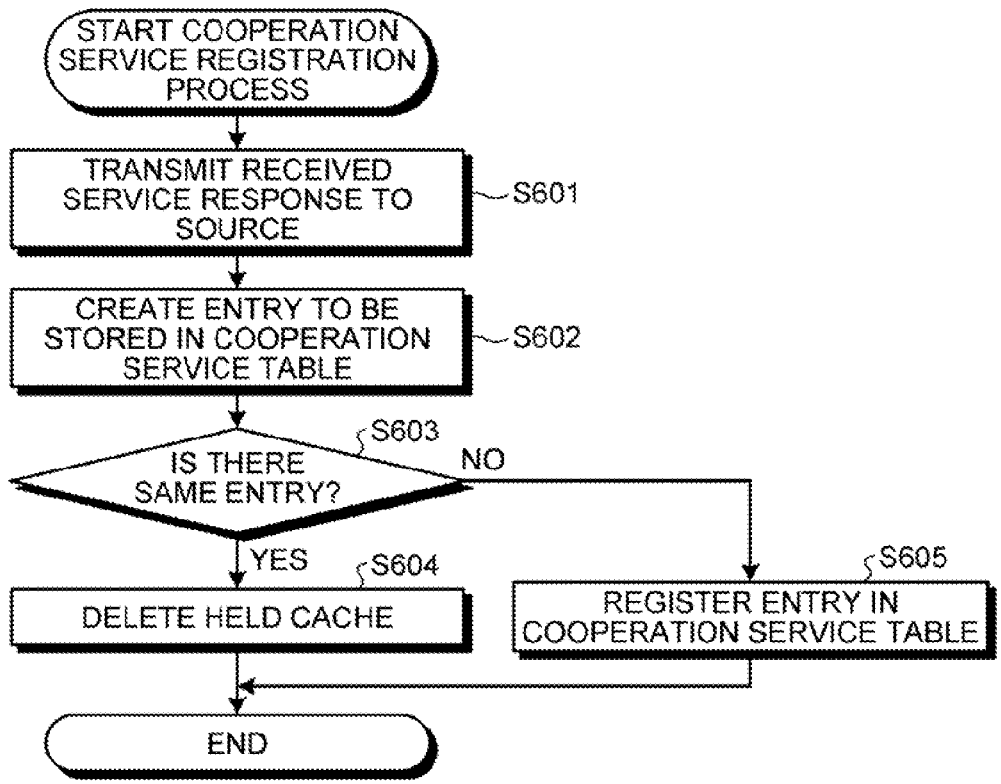
FIG. 15 is a flowchart illustrating the flow of a cooperation service registration process performed by the GW apparatus according to the second embodiment.

FIG. 15 is a flowchart illustrating the flow of a cooperation service registration process performed by the GW 50 apparatus according to the second embodiment.

As illustrated in FIG. 15, when the control unit 53 of the GW apparatus 50 receives a service request message indicating a service response, the control unit 53 transmits a received service response to a source (S601). For example, the accepting unit 54 of the control unit 53 transmits, through the transmitting and receiving unit 51, a service response to the source, as a response to the received service request message.

Subsequently, the control unit 53 creates an entry to be stored in the cooperation service table 52a (S602). For example, the control unit 53 obtains a set of "tenant ID, service URL, cooperation source IDP's URL, cooperation destination IDP's URL" from cache data held in the proxy authenticating unit 57 as one entry candidate.

Then, the control unit 53 determines whether the cooperation service table 52a has the same entry as the entry candidate (S603). For example, the control unit 53 determines whether the set of "tenant ID, service URL, cooperation source IDP's URL, cooperation destination IDP's URL" created at S602 is stored in the cooperation service table 52a.

Thereafter, if the control unit 53 determines that the cooperation service table 52a has the same entry as the entry candidate (Yes at S603), then the proxy authenticating unit 57 deletes the cache held therein (S604).

On the other hand, if the control unit 53 determines that the cooperation service table 52a does not have the same entry as the entry candidate (No at S603), then the control unit 53 registers the entry candidate created at S602 in the cooperation service table 52a, as a new entry (S605).

Sequence

Next, the overall processing sequence of the service providing system according to the second embodiment will be described. Here, a sequence for when a user logs in for the first time, a sequence from when being logged in until logout, and a sequence for relogin after logout will be described.

First Login

Figure 16:
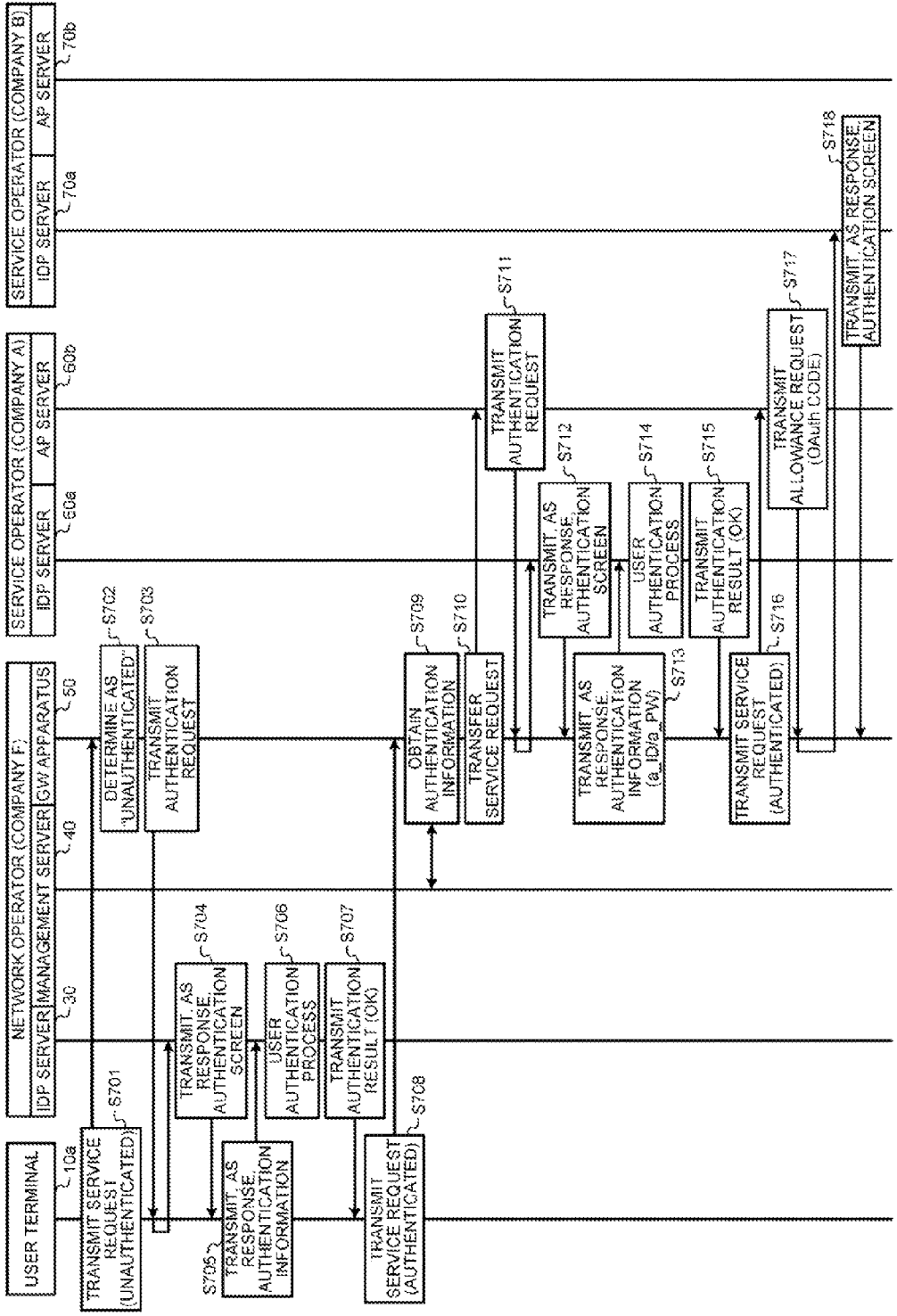
FIG. 16 is a processing sequence diagram for the first login in the service providing system according to the second embodiment.
Figure 17:
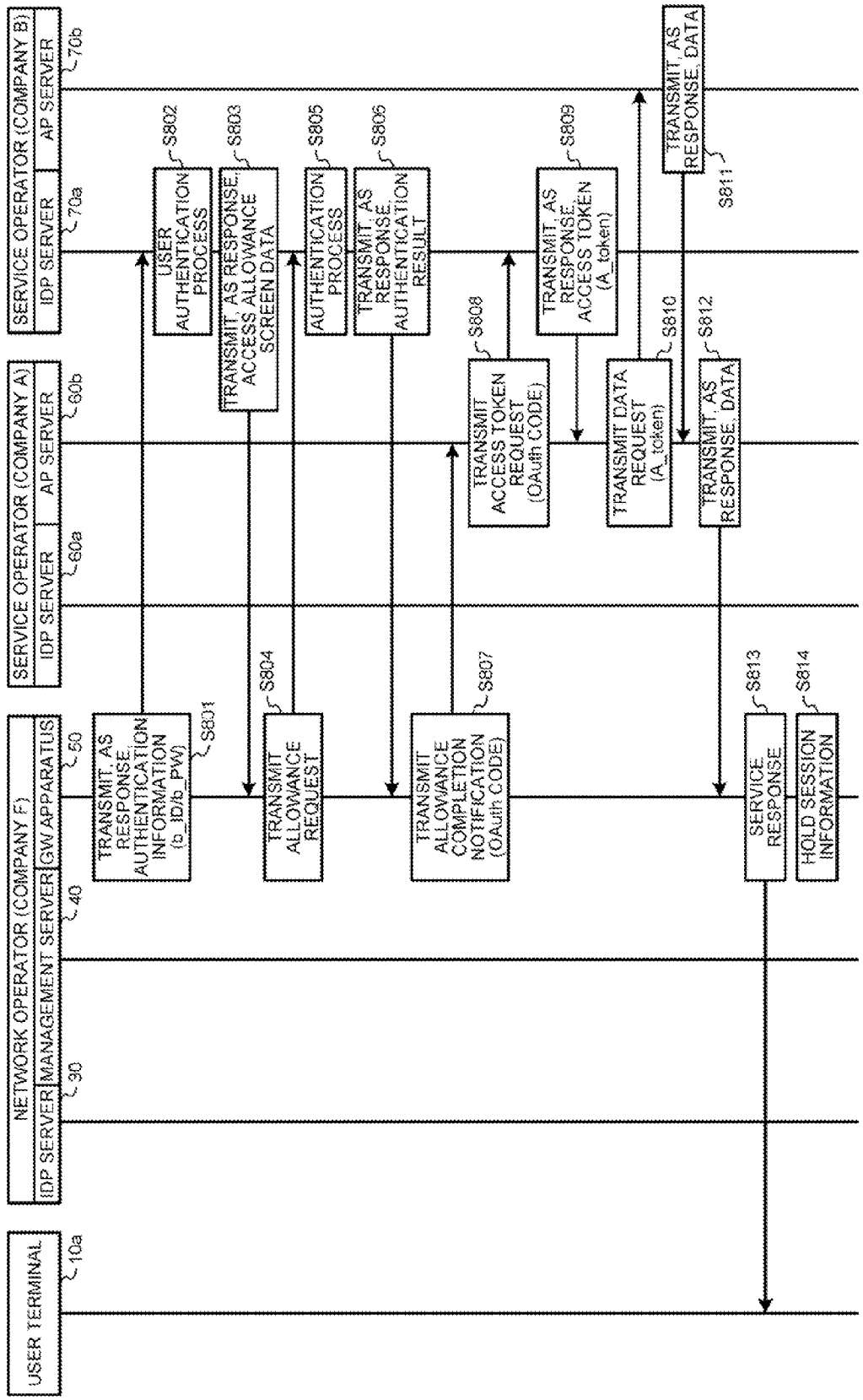
FIG. 17 is a processing sequence diagram for the first login in the service providing system according to the second embodiment.

FIGS. 16 and 17 are processing sequence diagrams for the first login in the service providing system according to the second embodiment. As illustrated in FIG. 16, the user terminal 10a transmits, by a user's instruction operation, a service request message to the AP server 60b "https://service1.com", with pre-authentication having not been performed (S701). Note, however, that the message is received by the GW apparatus 50.

Then, the pre-authenticating unit 55 of the GW apparatus 50 determines that the received service request message has not been authenticated (S702). For example, the pre-authenticating unit 55 determines that the service request message has not been authenticated, from the fact that the service request message does not include an identifier, etc., indicating that pre-authentication has been completed.

Subsequently, the pre-authenticating unit 55 of the GW apparatus 50 transmits an authentication request including a redirection instruction through the user terminal 10*a*, to the IDP server 30 (S703). The IDP server 30 transmits, as a response, an authentication screen to the user terminal 10*a* which has redirected the authentication request (S704).

The user terminal 10*a* transmits, as a response, an ID and a password which are inputted by a user onto the authentication screen received from the IDP server 30, to the IDP server 30, as authentication information (S705). The authenticating unit 33 of the IDP server 30 performs a user authentication process to determine whether the authentication information received from the user terminal 10*a* is stored in the login information table 32 (S706). Here it is assumed that the authentication information is stored in the login information table 32.

Then, the authenticating unit 33 of the IDP server 30 transmits an authentication result indicating that authentication has been allowed, to the user terminal 10*a* (S707). The user terminal 10*a* having received the authentication result transmits a service request message to the AP server 60*b* "https://service1.com" (S708). At this time, the user terminal 10*a* transmits the service request message with an identifier indicating that pre-authentication is done. Note, however, that the message transmitted here is received by the GW apparatus 50.

The pre-authenticating unit 55 of the GW apparatus 50 having received the message determines that authentication is done, and the inquiring unit 56 inquires the management server 40 about authentication information to obtain corresponding authentication information (S709).

For example, the proxy authenticating unit 57 obtains "service URL (https://service1.com), user ID (user001), tenant ID (tenantX)" from the service request message. Then, the proxy authenticating unit 57 obtains "IDP_URL (https://IDP1.com)" and "cooperation destination IDP_URL (https://IDP2.com)" associated with the obtained "service URL (https://service1.com), tenant ID (tenantX)", from the cooperation service table 52*a*. Here, the proxy authenticating unit 57 creates an entry for "https://service1.com, user001, tenantX, https://IDP1.com" and an entry for "https://service1.com, user001, tenantX, https://IDP2.com" which have been obtained so far, in the account management table 52*b*. Then, the inquiring unit 56 inquires the management server 40 about authentication information for the obtained "https://service1.com, user001, tenantX, https://IDP1.com" and authentication information for the obtained "https://service1.com, user001, tenantX, https://IDP2.com".

The authentication information providing unit 44 of the management server 40 searches the cloud association table 42 for service operators corresponding to the received "https://IDP1.com" and "https://IDP2.com". Then, the authentication information providing unit 44 identifies "company A's ID (a_ID), company A's password (a_PW)" associated with the "user001, tenantX" received from the GW apparatus 50, using an authentication information table 43 for the searched service operator (company A). Likewise, the authentication information providing unit 44 identifies "company B's ID (b_ID), company B's password (b_PW)" associated with the "user001, tenantX" received from the GW apparatus 50, using an authentication information table 43 for the searched service operator (company B). Thereafter, the authentication information providing unit 44 transmits, as a response, the identified "company A's ID (a_ID), company A's password (a_PW)" and "company B's ID (b_ID), company B's password (b_PW)" to the GW apparatus 50.

Then, the inquiring unit 56 of the GW apparatus 50 obtains the "company A's ID (a_ID), company A's password (a_PW)" and the "company B's ID (b_ID), company B's password (b_PW)" from the management server 40. Then, the proxy authenticating unit 57 stores the "company A's ID (a_ID), company A's password (a_PW)" in the entry for the service providing source "https://service1.com" which is created earlier in the account management table 52*b*. Likewise, the proxy authenticating unit 57 stores the "company B's ID (b_ID), company B's password (b_PW)" in the entry for the service providing destination "https://service2.com" which is created earlier in the account management table 52*b*.

Referring back to FIG. 16, the proxy authenticating unit 57 of the GW apparatus 50 transfers the service request message received from the user terminal 10*a* to the AP server 60*b* which is the destination thereof (S710).

The AP server 60*b* having received the message determines that the service request message has not been authenticated, and thus transmits an authentication request including a redirection instruction through the GW apparatus 50 which is the source, to the IDP server 60*a* (S711). The IDP server 60*a* transmits, as a response, an authentication screen to the GW apparatus 50 which has redirected the authentication request (S712).

As a response to the received authentication screen, the GW apparatus 50 transmits corresponding authentication information to the IDP server 60*a* (S713). For example, since the proxy authenticating unit 57 receives an authentication screen as a response to a service request message including "tenant ID (tenantX), user ID (user001)", the proxy authenticating unit 57 can identify "tenant ID (tenantX), user ID (user001)" which are the authentication object. In addition, the proxy authenticating unit 57 identifies a URL of a server that requests authentication, i.e., the service URL "https://service1.com", from a URL of the authentication screen, etc. Then, the proxy authenticating unit 57 identifies "a_ID, a_PW" associated with the "tenant ID (tenantX), user ID (user001),d service URL "https://service1.com"", from the account management table 52*b* and transmits, as a response, the identified "a_ID, a_PW" to the IDP server 60*a*.

The IDP server 60*a* performs a user authentication process to determine whether the user is a valid user, by determining whether the authentication information received from the GW apparatus 50 is stored (S714). Here it is assumed that the IDP server 60*a* determines that the user is a valid user.

Then, the IDP server 60*a* transmits an authentication result indicating that authentication has been allowed, to the GW apparatus 50 (S715). The GW apparatus 50 having received the authentication result transmits a service request message to the AP server 60*b* "https://service1.com" (S716).

Thereafter, the AP server 60*b* analyzes the content of the service request message and thereby recognizes that it is a cooperation process with the AP server 70*b*.

Then, the AP server 60*b* transmits an allowance request message including a redirection instruction through the GW apparatus 50 and including a received OAuth code, to the IDP server 70*a* of company B which is a service operator (S717). At this time, the OAuth code can be included in a response message in HTTP (HyperText Transfer Protocol) format. Since the GW apparatus 50 performs proxy authentication of the IDP server 70*a* according to the allowance request message, here, the allowance request message is a kind of an authentication request message.

Then, the IDP server 70*a* receives the allowance request message including the OAuth code and transmits, as a response thereto, an authentication screen to the GW apparatus 50 which is the redirection source (S718).

Subsequently, as illustrated in FIG. 17, the GW apparatus 50 transmits, as a response to the received authentication screen, corresponding authentication information to the IDP server 70*a* (S801). For example, since the proxy authenticating unit 57 receives an authentication screen as a response to a service request message including "tenant ID (tenantX), user ID (user001)", the proxy authenticating unit 57 can identify "tenant ID (tenantX), user ID (user001)" which are the authentication object. In addition, the proxy authenticating unit 57 identifies a URL of a server that requests authentication, i.e., the service URL "https://service2.com", from a URL of the authentication screen, etc. Then, the proxy authenticating unit 57 identifies "b_ID, b_PW" associated with the tenant ID (tenantX), the user ID (user001), and the service URL "https://service2.com", from the account management table 52*b* and transmits, as a response, the identified "b_ID, b_PW" to the IDP server 70*a*.

The IDP server 70*a* performs a user authentication process to determine whether the user is a valid user, by determining whether the authentication information received from the GW apparatus 50 is stored (S802). Here it is assumed that the IDP server 70*a* determines that the user is a valid user. Then, the IDP server 70*a* transmits access allowance screen data to the GW apparatus 50 (S803). The access allowance screen data is, for example, data on a screen that presents the content and condition of document data to be accessed by the AP server 60*b* and that urges to determine whether it is OK to allow access. The screen data serves as an access allowance determination request.

The proxy authenticating unit 57 of the GW apparatus 50 having received the screen data transmits an access allowance request message including an OAuth code, to the IDP server 70*a* (S804). The access allowance request message is a message inquiring whether it is OK to allow the content indicated by the access allowance screen data.

Thereafter, the IDP server 70*a* performs an authentication process (S805). Then, the IDP server 70*a* transmits, as a response, an authentication result message including a redirection instruction through the GW apparatus 50 and indicating that authentication has been allowed, to the AP server 60*b* (S806). For example, when access is allowed by the GW apparatus 50, the IDP server 70*a* transmits an authentication result message including an OAuth code indicating access allowance, to the AP server 60*b*.

The proxy authenticating unit 57 of the GW apparatus 50 having received the authentication result message transmits an allowance completion notification including an OAuth code indicating access allowance, to the AP server 60*b* which is the redirection destination (S807).

The AP server 60*b* having received the allowance completion notification transmits an access token request to the IDP server 70*a* (S808). The access token request includes an OAuth code indicating access allowance.

Then, when the IDP server 70*a* receives the access token request, the IDP server 70*a* confirms that the access token request includes an OAuth code indicating access allowance, and thereafter transmits an access token response to the AP server 60*b* (S809). The access token response includes an access token (A_token) indicating an API for obtaining data.

When the AP server 60*b* receives the access token response, the AP server 60*b* transmits a data request using the API for obtaining data which is included in the access token, to the AP server 70*b* (S810). According to the received data request, the AP server 70*b* transmits, as a response, corresponding data to the AP server 60*b* (S811).

The AP server 60*b* transmits data obtained by performing a predetermined process on the data received from the AP server 70*b*, to the GW apparatus 50 (S812). The GW apparatus 50 transmits, as a response, the data received from the AP server 60*b*, to the user terminal 10*a* (S813). For example, the AP server 60*b* converts document data received from the AP server 70*b* into print data and transmits, as a response, the print data to the user terminal 10*a* through the GW apparatus 50.

In addition, the session managing unit 58 of the GW apparatus 50 collects information on sessions where the service is provided to the user terminal 10*a*, and stores the information in the session management table 52*c* (S814). Specifically, the session managing unit 58 collects session information between the GW apparatus 50 and the AP server 60*b*, session information between the GW apparatus 50 and the AP server 70*b*, and a relationship between these pieces of session information.

For example, by referring to the account management table 52*b*, the session managing unit 58 can identify which user at which tenant accesses which service URL. In addition, by referring to the cooperation service table 52*a*, the session managing unit 58 can identify with which URL the identified service URL cooperates. In addition, the session managing unit 58 can identify, from currently established sessions or cookies on Web screens transmitted and received between the GW apparatus 50 and other servers, session IDs identifying the sessions. Then, the session managing unit 58 creates an entry where the above-described pieces of identified information are associated with one another, and stores the entry in the session management table 52*c*.

In this manner, the GW apparatus 50 can perform a procedure of proxy authentication for using the functions of a plurality of AP servers that perform a cooperation service. Moreover, the GW apparatus 50 can obtain a plurality of pieces of authentication information at once which are used for proxy authentication, from the management server 40.

From when being Logged in Until Logout

Figure 18:
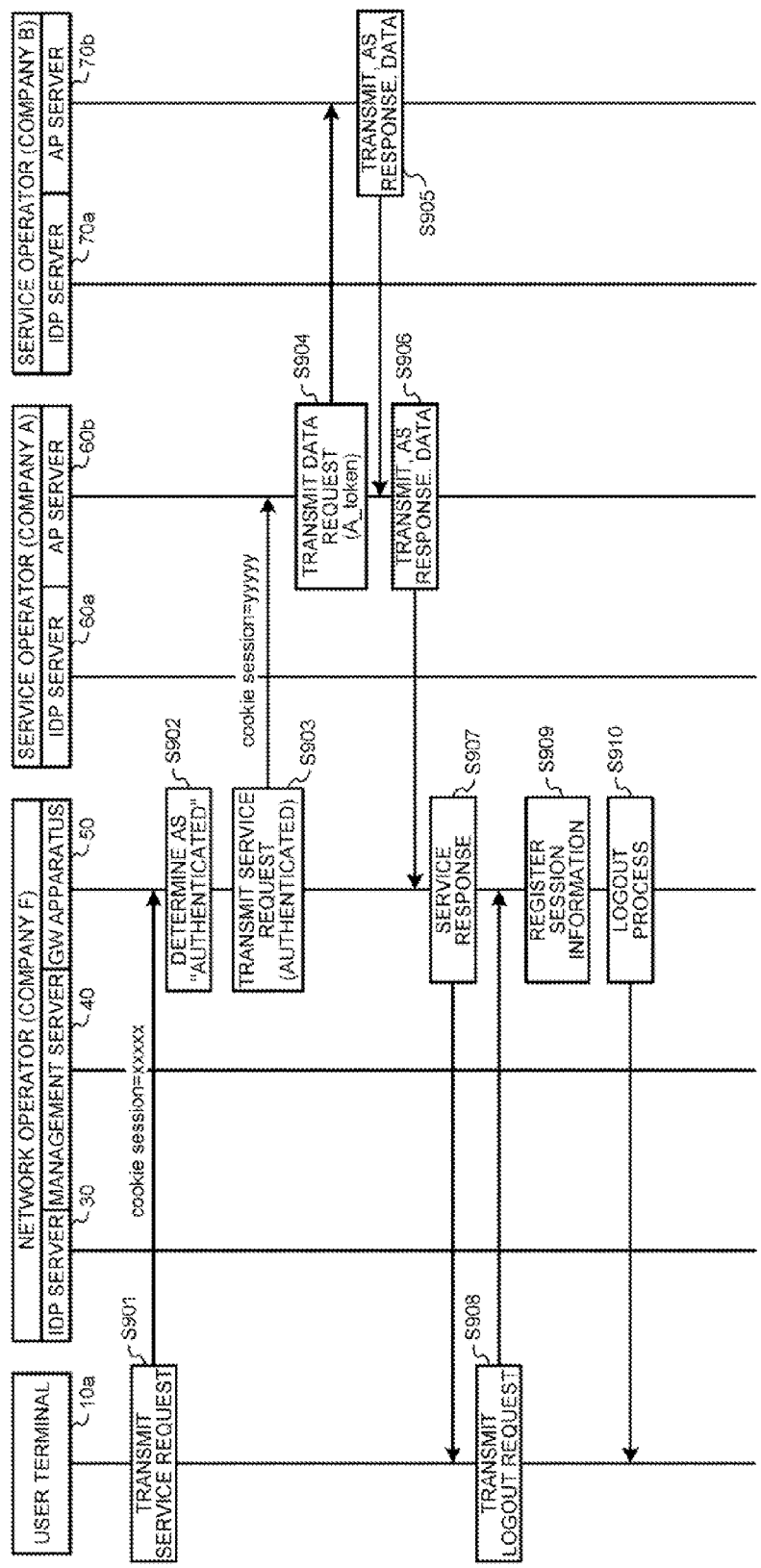
FIG. 18 is a processing sequence diagram for from when being logged in until logout in the service providing system according to the second embodiment.

FIG. 18 is a processing sequence diagram for from when being logged in until logout in the service providing system according to the second embodiment.

The user terminal 10*a* being logged in transmits a service request message including the session ID=xxxxx indicating a session of being logged in, to the AP server 60*b* "https://service1.com" (S901). Note, however, that the message is received by the GW apparatus 50.

Then, the pre-authenticating unit 55 of the GW apparatus 50 determines that the received service request message has been authenticated (S902). For example, since "xxxxx" included in a cookie in the case of using a Web page having received the service request message is the session of being logged in, the pre-authenticating unit 55 determines that the service request message has been pre-authenticated. In addition, since "tenant ID, user ID" included in the service request message are registered in the session management table 52*c*, the pre-authenticating unit 55 can also determine that the service request message has been pre-authenticated.

Then, as with S716, the proxy authenticating unit 57 of the GW apparatus 50 transmits a service request message to the AP server 60*b* "https://service1.com" (S903). For example, the proxy authenticating unit 57 identifies a "service URL (cooperation source)" and a "cooperation source's session ID" associated with the "tenant ID, user ID" included in the service request message, from the session management table 52*c*. Then, the proxy authenticating unit 57 transmits a service request message to the "service URL (cooperation source)=https://service1.com", using a session identified by the identified "cooperation source's session ID".

The processes from S904 to S907 performed thereafter are the same as those from S810 to S813 described in FIG. 17 and thus detailed description thereof is omitted.

The user terminal 10a having used the service transmits a logout request to the AP server 60b "https://service1.com" by a user's instruction operation (S908). Note, however, that the message is received by the GW apparatus 50. In addition, a cookie of the logout request includes the session ID=yyyyy.

The session managing unit 58 of the GW apparatus 50 having received the logout request registers session information for the service, the provision of which is received by the user terminal 10a, in the session maintenance table 52d (S909) and thereafter performs logout (S910). For example, the session managing unit 58 registers the "service URL (cooperation source), cooperation source's session ID, service URL (cooperation destination), cooperation destination's session ID" associated with the "tenant ID, user ID" of the user terminal 10a, in the session maintenance table 52d.

At Relogin

Figure 19:
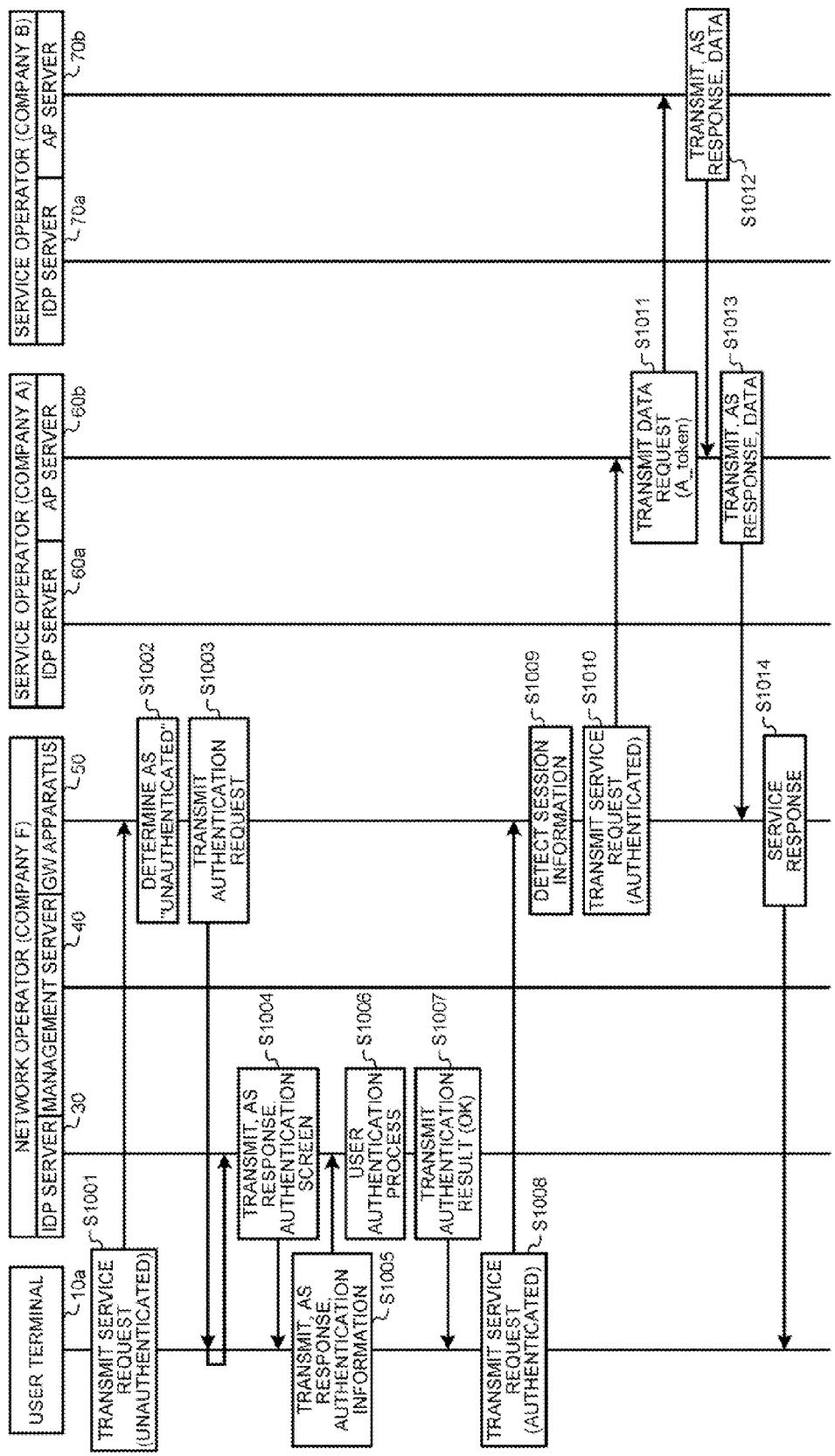
FIG. 19 is a processing sequence diagram for relogin in the service providing system according to the second embodiment.

FIG. 19 is a processing sequence diagram for relogin in the service providing system according to the second embodiment. As illustrated in FIG. 19, the processes from S1001 to S1008 are the same as those from S701 to S708 in FIG. 16, and thus detailed description thereof is omitted.

The pre-authenticating unit 55 of the GW apparatus 50 having received an authenticated service request message determines that the service request message has been authenticated, and the session managing unit 58 detects session information from the session maintenance table 52d (S1009).

For example, the session managing unit 58 extracts "tenant ID, user ID, service URL" included in the service request message. Subsequently, the session managing unit 58 searches the account management table 52b for an entry corresponding to the extracted "tenant ID, user ID, service URL" and thereby identifies "ID, PW". Then, the session managing unit 58 searches the session maintenance table 52d for an entry corresponding to a set of the extracted "tenant ID, service URL" and the identified "ID" and thereby identifies "session ID, cooperation destination". Thereafter, the session managing unit 58 requests the extracted "service URL" for a service in cooperation with the "cooperation destination", using a session identified by the session ID (S1010).

The processes from S1011 to S1014 performed thereafter are the same as those from S810 to S813 in FIG. 17 and thus detailed description thereof is omitted.

As such, in the service providing system according to the second embodiment, in place of a user terminal, the GW apparatus 50 can perform authentication to each AP server on behalf of the user terminal. In addition, since the GW apparatus 50 can obtain authentication information at once from the management server 40, a proxy authentication process is made efficient. In addition, after the user logs out, the GW apparatus 50 can maintain sessions used in login. Hence, when a user having used a service logs in again to use the service after logging out, a verification phase in an OAuth process can be omitted. Therefore, an OAuth process can be prevented from becoming a bottleneck, enabling suppression of degradation in processing performance.

[c] Third Embodiment

Although the embodiments of the present invention have been described so far, the present invention may be performed in various different embodiments other than those described above. Now, different embodiments will be described below.

Session Maintenance Determination

For example, the GW apparatus 50 can provide, for each service, a determination criterion as to whether to maintain session information. FIG. 20 is a diagram illustrating an exemplary session information determination criterion. As illustrated in FIG. 20, the GW apparatus 50 stores "a service URL (cooperation source), a service URL (cooperation destination), session operation, timeout" in association with one another. In the "session operation" stored here, information indicating as to whether to maintain or delete sessions is set. In the "timeout", timing at which the sessions are deleted is set.

Using FIG. 20 as an example, the GW apparatus 50 maintains session information for a service where the service cooperation source is "https://service1.com" and the service cooperation destination is "https://service2.com", for 24 hours and deletes the session information after a lapse of 24 hours. That is, the GW apparatus 50 holds session information that meets the above-described condition in the session maintenance table 52d for 24 hours and deletes corresponding entries from the session maintenance table 52d after a lapse of 24 hours. The information stored in FIG. 20 is updated by an administrator, etc.

As such, since whether to maintain or delete, etc., can be flexibly set for each service, a high level of security can be maintained. For example, in the case of a service having a high risk to continuously maintain sessions such as a payment site, session information for the service can be deleted instead of being maintained.

Group Management

Although the second embodiment describes an example in which each user has an ID and a PW for authentication to each AP server, the configuration is not limited thereto, and a plurality of users can share an ID and a PW for authentication to each AP server. That is, one group account can be shared by a plurality of users.

Figure 21:
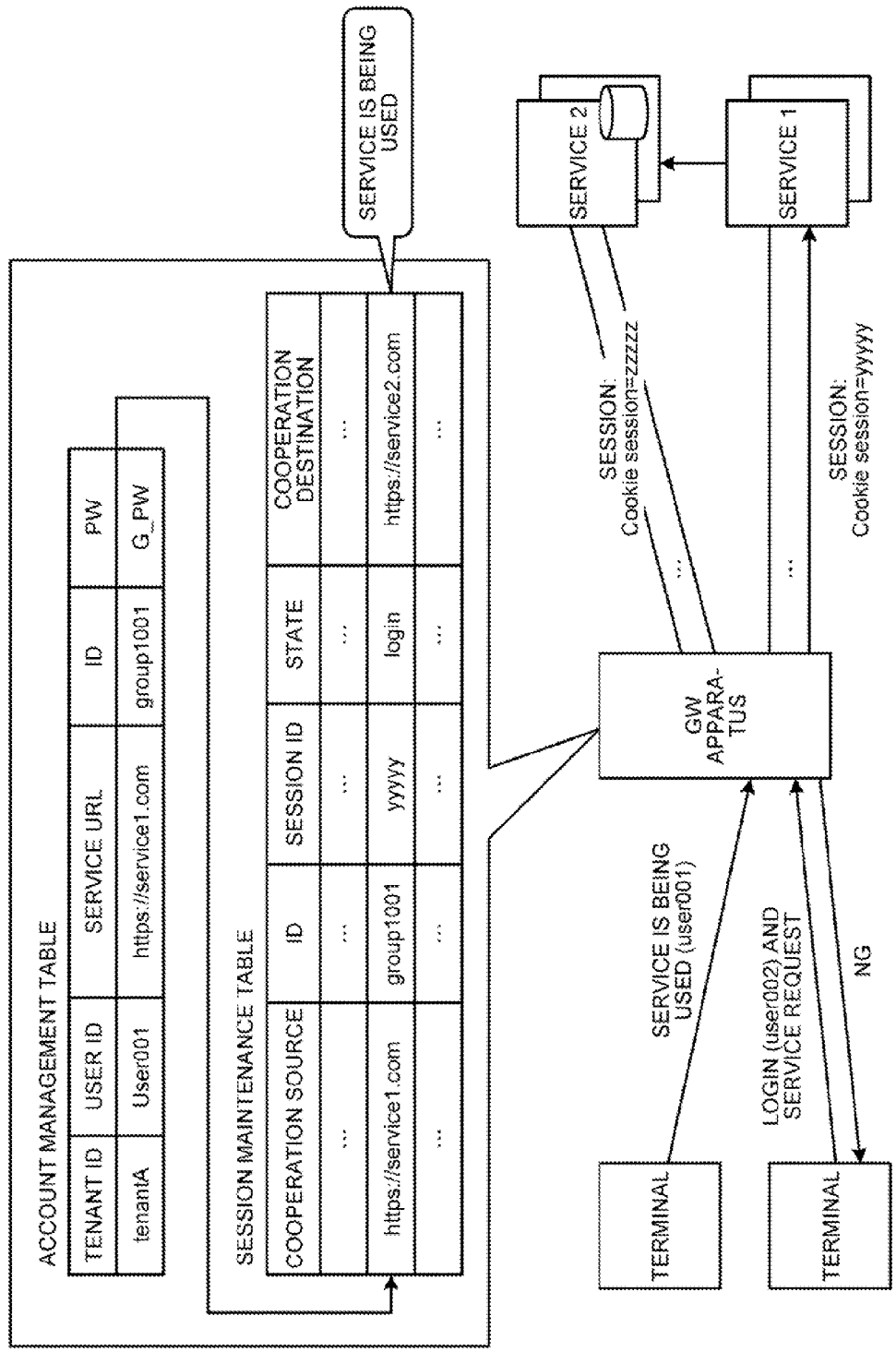
FIG. 21 is a diagram illustrating an example of the case in which one account can be used by one user.

FIG. 21 is a diagram illustrating an example of the case in which one user can use one account. The configuration in FIG. 21 is the same as those in the first and second embodiments and thus detailed description thereof is omitted. As illustrated in FIG. 21, the GW apparatus 50 stores "tenant ID=tenantA, user ID=User001, service URL=https://service1.com, ID=group1001, PW=G_PW" in the account management table 52b. In addition, the GW apparatus 50 stores "cooperation source=https://service1.com, ID=group1001, session ID=yyyyy, state=login, cooperation destination=https://service2.com" in the session maintenance table 52d. That is, the user ID=User001 belonging to the ID=group1001 is in a state of using a service provided by the "https://service1.com" connected with use of the session ID=yyyyy.

It is assumed that in such a state, the user ID=User002 belonging to the ID=group1001 logs in and transmits a service request message. In this case, in accordance with the condition where one user can use one account, the GW apparatus 50 rejects the service request message from the "user ID=User002". By doing so, even in the case of sharing an ID, the same security level as that for one user—one account can be maintained.

Figure 22:
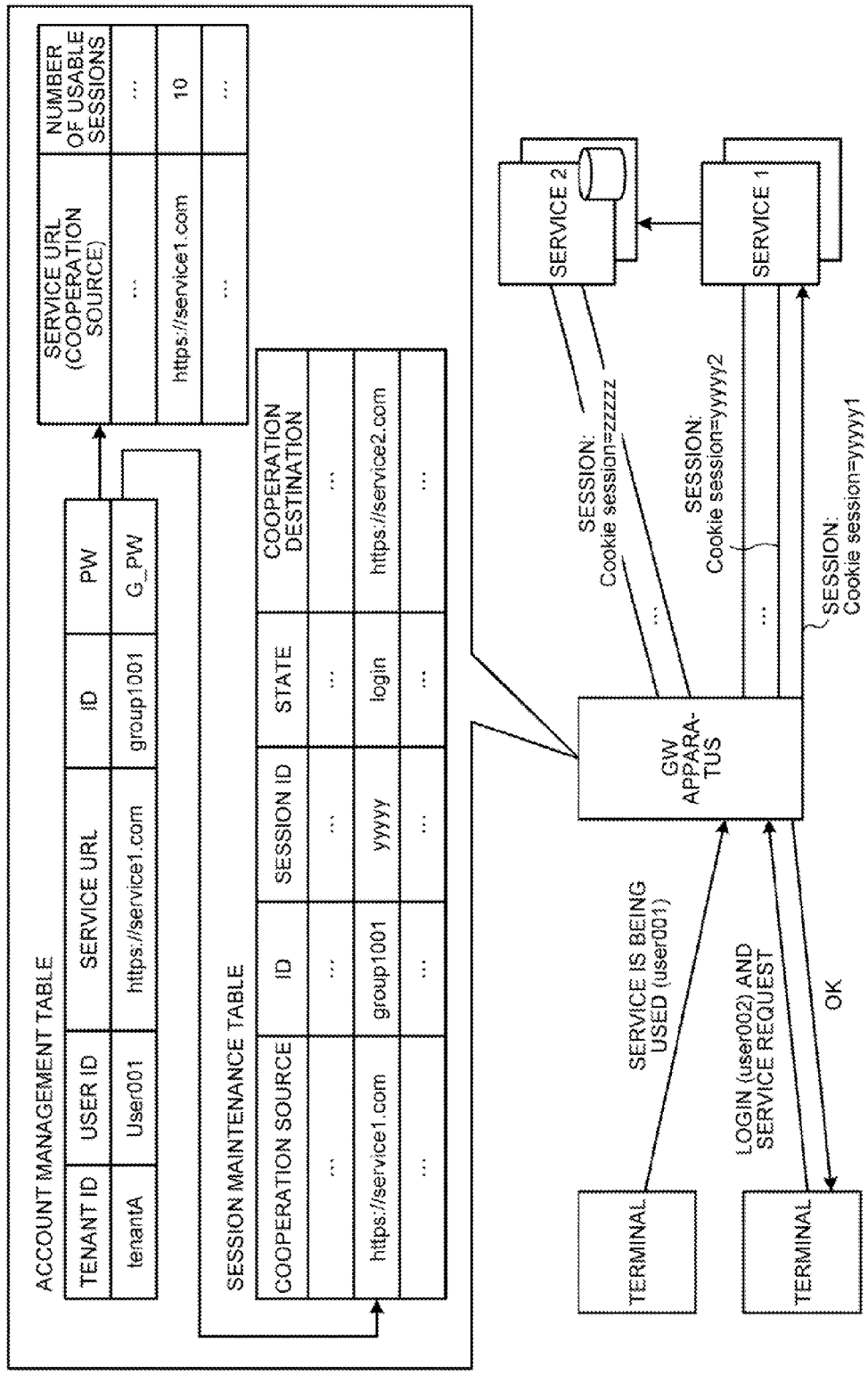
FIG. 22 is a diagram illustrating an example of the case in which one account can be used by a plurality of users.

FIG. 22 is a diagram illustrating an example of the case in which a plurality of users can use one account. The configuration in FIG. 22 is the same as those in the first and second embodiments and thus detailed description thereof is omitted. In addition, the states of the account management table 52b and the session maintenance table 52d in FIG. 22 are the same as those in FIG. 21 and thus description thereof is omitted.

FIG. 22 is different from FIG. 21 in that the GW apparatus 50 stores the number of usable sessions in association with a service URL.

In such a state, it is assumed that the user ID=User002 belonging to the ID=group1001 logs in and transmits a service request message. In this case, in accordance with the condition where 10 users can use one account, the GW apparatus 50 allows the service request message from the "user ID=User002". At this time, when the number of users exceeds an upper limit, the GW apparatus 50 rejects the service request message from the "user ID=User002". By doing so, the number of connectable sessions can be defined for each AP server or each service, and thus, flexible services can be provided with security suitable for the services.

System

Of the processes described in the present embodiments, all or part of a process described as being performed automatically can also be performed manually. Alternatively, all or part of a process described as being performed manually can also be performed automatically by known methods. In addition, the processing procedures, control procedures, specific names, and information including various data and parameters illustrated in the above-described document and drawings can be arbitrarily changed unless otherwise specified.

The components of each apparatus illustrated in the drawings are functionally conceptual and do not necessarily need to be physically configured in the manner illustrated in the drawings. Namely, a specific mode of dispersion and integration of each apparatus is not limited to those illustrated in the drawings. That is, all or part thereof can be configured by being functionally or physically dispersed or integrated in any unit, according to various types of load, the status of use, etc. Further, for each processing function performed by each apparatus, all or any part of the processing function can be implemented by a CPU and a program analyzed and executed by the CPU or can be implemented as hardware by wired logic.

Hardware Configuration

Meanwhile, various processes described in the above-described embodiments can be implemented by a computer system, such as a personal computer or a workstation, executing a program prepared in advance. In the following, an example of a computer that executes a program having the same functions as those in the above-described embodiments will be described.

Figure 23:
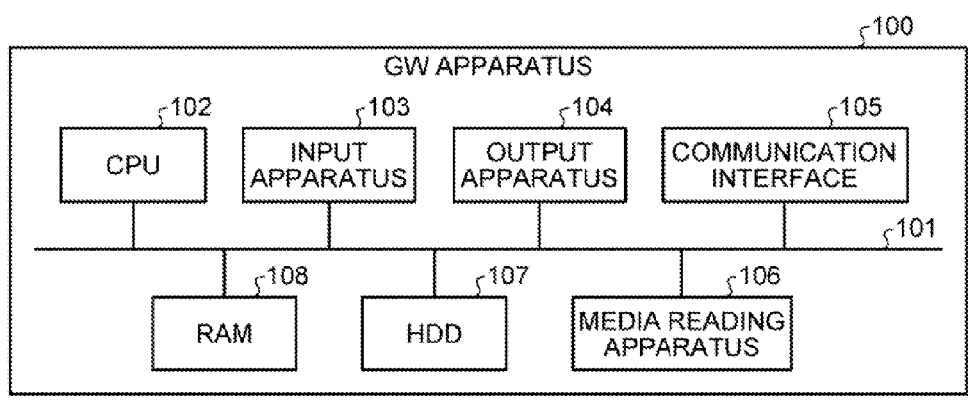
FIG. 23 is a diagram illustrating an exemplary hardware configuration.

FIG. 23 is a diagram illustrating an exemplary hardware configuration. As illustrated in FIG. 23, a GW apparatus 100 includes a CPU 102, an input apparatus 103, an output apparatus 104, a communication interface 105, a media reading apparatus 106, an HDD (Hard Disk Drive) 107, and a RAM (Random Access Memory) 108. The components illustrated in FIG. 23 are connected to each other by a bus 101.

The input apparatus 103 is a mouse and a keyboard. The output apparatus 104 is a display, etc. The communication interface 105 is an interface such as a NIC (Network Interface Card). The HDD 107 stores a program that performs the functions illustrated in FIG. 3, etc., and the tables described in the first and second embodiments, etc. Although the HDD 107 is used as an example of a recording medium, various programs may be stored in other computer readable recording media such as a ROM (Read Only Memory), a RAM, and a CD-ROM, and may be read by a computer. Note that a recording medium may be placed in a remote location and a computer may obtain and use a program by accessing the recording medium. At that time, the obtained program may be stored in a recording medium of the GW apparatus itself and used.

The CPU 102 allows a process that performs the functions described in FIG. 3, etc., to operate by reading a program that performs the same processes as those performed by the processing units illustrated in FIG. 3, and decompressing the program to the RAM 108. Namely, the process performs the accepting unit 54, the pre-authenticating unit 55, the inquiring unit 56, the proxy authenticating unit 57, and the session managing unit 58. As such, the GW apparatus 100 operates as an information processing apparatus that performs a session management method by reading and executing a program.

In addition, the GW apparatus 100 can implement the same functions as those in the above-described embodiments by reading, by the media reading apparatus 106, the above-described program from a recording medium and executing the read program. Note that the program referred to in this another embodiment is not limited to being executed by the GW apparatus 100. The present invention can also be applied in the same manner even in the case, for example, in which another computer or a server executes the program or in which another computer and a server execute the program in cooperation with each other. Note that other apparatuses illustrated in FIGS. 1 and 2 can also use the same hardware configuration as that in FIG. 23.

According to an aspect of the invention disclosed herein, degradation in processing performance can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A service request apparatus including:
a storage unit; and
a processor coupled to the storage unit, wherein the processor executes a process comprising:
storing in the storage unit, when a user logs out of the service request apparatus after the user has logged in thereto to be provided with a service by a service cooperation source in cooperation with a service cooperation destination, an entry including cooperation source session information and cooperation destination session information in association with a user identifier that identifies the user, the cooperation source session information indicating information on a session having been used for connection between the service request apparatus and the service cooperation source and the cooperation destination session information indicating information on a session having been used for connection between the service request apparatus and the service cooperation destination;
determining, when the user re-logs in to the service request apparatus to be provided with the service by the service cooperation source, whether the user identifier of the user is stored in the storage unit; and
requesting, when it is determined at the determining that the user identifier is stored in the storage unit, the service cooperation source for provision of the service in cooperation with the service cooperation destination, connection between the service request apparatus and the service cooperation source or the service cooperation destination being performed respectively by using the cooperation source session information or the cooperation destination session information stored in the storage unit in association with the user identifier.

2. The service request apparatus according to claim 1, wherein the process further comprises authenticating whether a user who requests the service cooperation source for provision of a service is a valid user, wherein
the determining includes determining, for the user having been authenticated as the valid user at the authenticating, whether a user identifier of the user is stored in the storage unit.

3. The service request apparatus according to claim 1, wherein the process further comprises deleting an entry among entries stored in the storage unit whose validity period has expired, the validity period being determined for each service provided to the user and indicating a time for which the entry is retained in the storage unit.

4. The service request apparatus according to claim 1, wherein
the user identifier stored in the storage unit is an identifier that identifies a group to which a plurality of users belong, and
the determining includes determining, when a user requests the service cooperation source for provision of a service, whether a number of users including the user who belong to the group and have logged in to the service request apparatus exceeds a number of usable sessions predetermined for the group.

5. A service request method comprising:
storing, using a processor, in a storage unit coupled to the processor, when a user logs out of a service request apparatus after the user has logged in thereto to be provided with a service by a service cooperation source in cooperation with a service cooperation destination, an entry including cooperation source session information and cooperation destination session information in association with a user identifier that identifies the user, the cooperation source session information indicating information on a session having been used for connection between the service request apparatus and the service cooperation source and the cooperation destination session information indicating information on a session having been used for connection between the service request apparatus and the service cooperation destination;
determining, using the processor, when the user re-logs in to the service request apparatus to be provided with the service by the service cooperation source, whether the user identifier of the user is stored in the storage unit; and
when it is determined that the user identifier is stored in the storage unit, requesting, using the processor, the service cooperation source for provision of the service in cooperation with the service cooperation destination, connection between the service request apparatus and the service cooperation source or the service cooperation destination being performed respectively by using the cooperation source session information or the cooperation destination session information stored in the storage unit in association with the user identifier.

6. A non-transitory computer-readable recording medium having stored therein a program for causing a computer to execute a process comprising:
storing in a storage unit, when a user logs out of the computer after the user has logged in thereto to be provided with a service by a service cooperation source in cooperation with a service cooperation destination, an entry including cooperation source session information and cooperation destination session information in association with a user identifier that identifies the user, the cooperation source session information indicating information on a session having been used for connection between the computer and the service cooperation source and the cooperation destination session information indicating information on a session having been used for connection between the computer and the service cooperation destination;
determining when the user re-logs in to the computer to be provided with the service by the service cooperation source, whether the user identifier of the user is stored in the storage unit; and
when it is determined that the user identifier is stored in the storage unit, requesting the service cooperation source for provision of the service in cooperation with the service cooperation destination, connection between the computer and the service cooperation source or the service cooperation destination being performed respectively by using the cooperation source session information or the cooperation destination session information stored in the storage unit in association with the user identifier.

* * * * *